US010625158B2

(12) United States Patent
Kim

(10) Patent No.: US 10,625,158 B2
(45) Date of Patent: Apr. 21, 2020

(54) APPARATUS AND METHOD OF PROVIDING TIMING GAME BASED ON TOUCH

(71) Applicant: Jin Young Kim, Jeju (KR)

(72) Inventor: Jin Young Kim, Jeju (KR)

(*) Notice: Subject to any disclaimer, the term of this patent is extended or adjusted under 35 U.S.C. 154(b) by 0 days.

(21) Appl. No.: 15/561,017

(22) PCT Filed: Mar. 22, 2016

(86) PCT No.: PCT/KR2016/002881
§ 371 (c)(1),
(2) Date: Sep. 22, 2017

(87) PCT Pub. No.: WO2016/153260
PCT Pub. Date: Sep. 29, 2016

(65) Prior Publication Data
US 2018/0078857 A1    Mar. 22, 2018

(30) Foreign Application Priority Data

Mar. 23, 2015   (KR) .................. 10-2015-0040084
May 27, 2015   (KR) .................. 10-2015-0074314

(51) Int. Cl.
*A63F 9/24* (2006.01)
*A63F 11/00* (2006.01)
(Continued)

(52) U.S. Cl.
CPC .......... *A63F 13/44* (2014.09); *A63F 13/2145* (2014.09); *A63F 13/426* (2014.09);
(Continued)

(58) Field of Classification Search
CPC ... G07F 17/32; G07F 17/3262; G07F 17/3269
(Continued)

(56) References Cited

U.S. PATENT DOCUMENTS

2009/0278809 A1* 11/2009 Ohsawa .................. A63F 13/10
                                                          345/173
2012/0319989 A1* 12/2012 Argiro .................... G06F 3/038
                                                          345/174
(Continued)

FOREIGN PATENT DOCUMENTS

KR   10-2012-0019566 A    3/2012
KR      10-1329618 B1    11/2013
KR   10-2014-0112333 A    9/2014

OTHER PUBLICATIONS

International Search Report for International Patent Application No. PCUKR2016/002881 filed on Mar. 22, 2016.
(Continued)

*Primary Examiner* — Adetokunbo O Torimiro

(57) ABSTRACT

Disclosed are an apparatus and a method of providing a timing game based on a touch. The present invention provides a user with an input indicator guiding a region which a user is to touch, separately from a timing indicator set formed of the plurality of timing indicators guiding touch timing, thereby enabling a user to visually confirm accurate touch timing indicated by the timing indicator set. Further, the present invention provides a fluid input indicator, as well as a touch indicator, thereby providing a new game progress method, which has not been provided in an existing touch-based timing game.

15 Claims, 24 Drawing Sheets

(51) Int. Cl.
*G06F 13/00* (2006.01)
*G06F 17/00* (2019.01)
*A63F 13/44* (2014.01)
*A63F 13/52* (2014.01)
*A63F 13/2145* (2014.01)
*G06F 3/0488* (2013.01)
*G06F 3/0484* (2013.01)
*A63F 13/426* (2014.01)
*A63F 13/577* (2014.01)

(52) U.S. Cl.
CPC ............ *A63F 13/52* (2014.09); *A63F 13/577* (2014.09); *G06F 3/0488* (2013.01); *G06F 3/04847* (2013.01)

(58) Field of Classification Search
USPC .................. 463/1, 10, 20, 22, 25, 39, 40, 42
See application file for complete search history.

(56) References Cited

U.S. PATENT DOCUMENTS

| 2013/0157761 | A1* | 6/2013 | Cichowlas | G09B 15/003 463/31 |
| 2013/0260877 | A1* | 10/2013 | Katagai | A63F 13/814 463/29 |
| 2014/0080557 | A1* | 3/2014 | O | G06Q 30/0601 463/7 |
| 2014/0364222 | A1 | 12/2014 | Tanaka et al. | |

OTHER PUBLICATIONS

"Question about Collision of Rhythm Game", DevKorea, Jan. 7, 2012, <http://devkorea.co.kr/bbs/board.php?bo_table=m03_qna&wr_id=12230>.

* cited by examiner

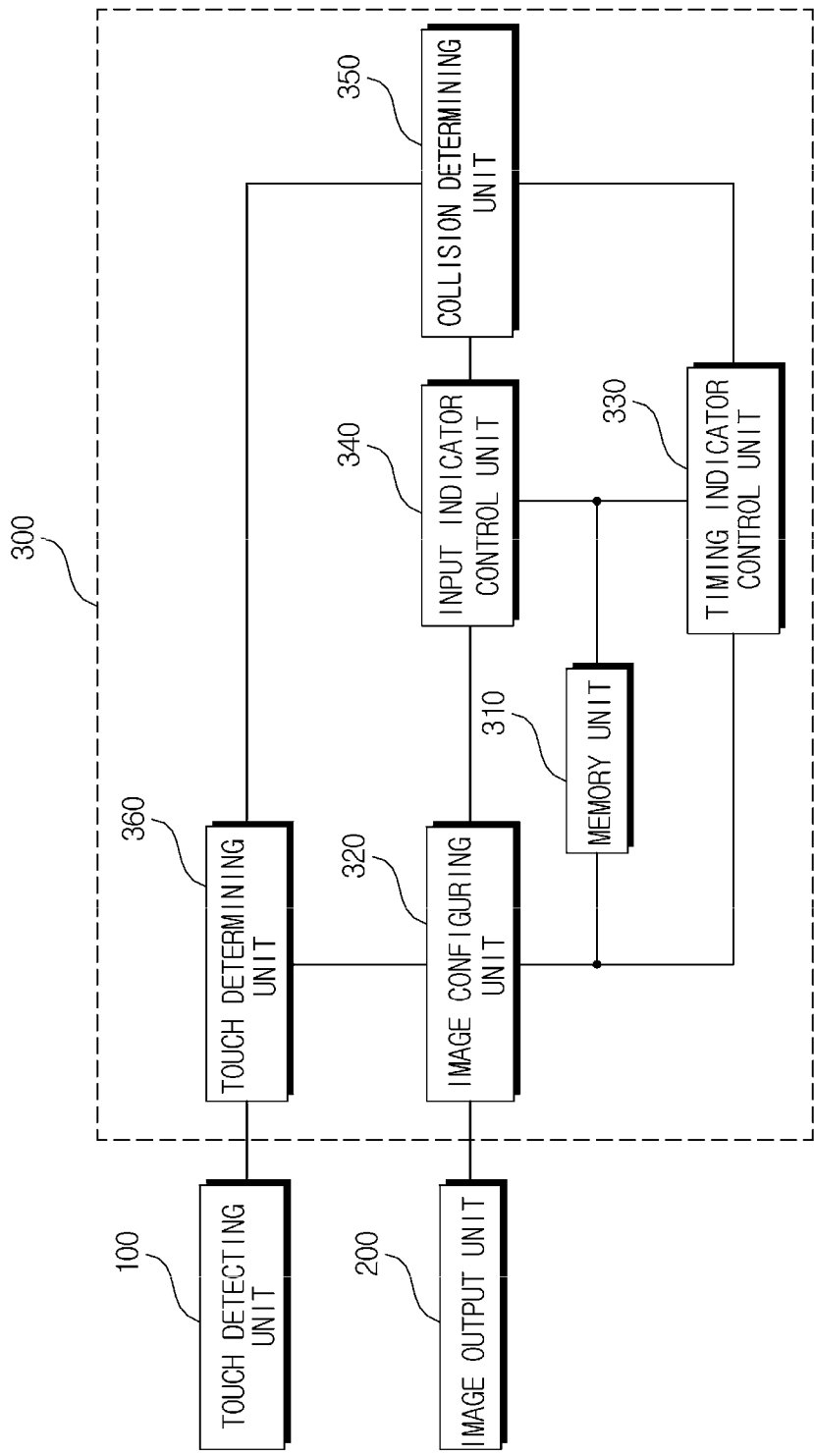

[FIG. 2A]
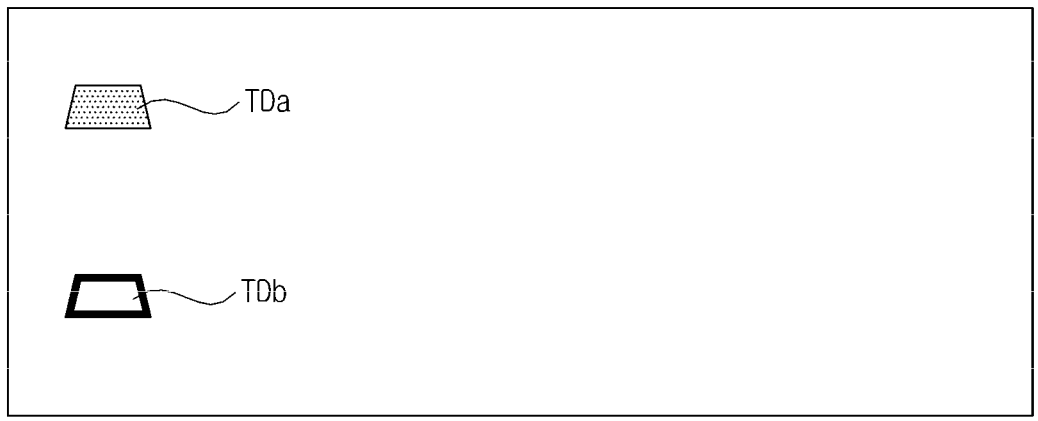
[FIG. 2B]
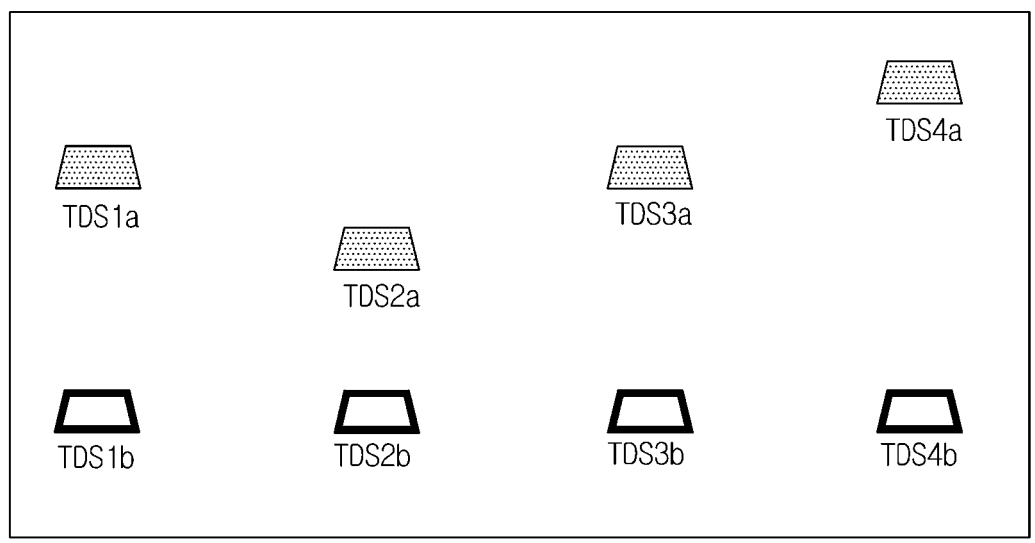
[FIG. 3A]
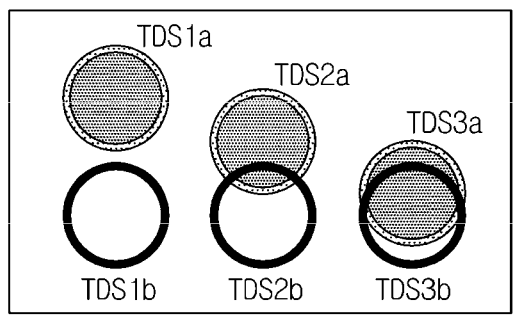
[FIG. 3B]
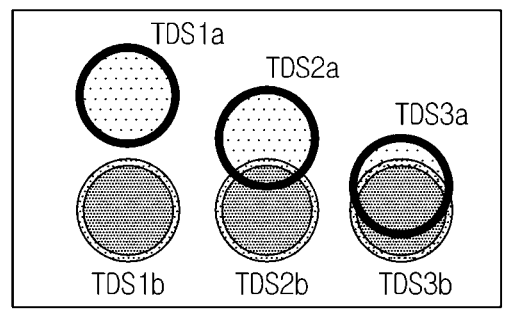

[FIG. 4A]
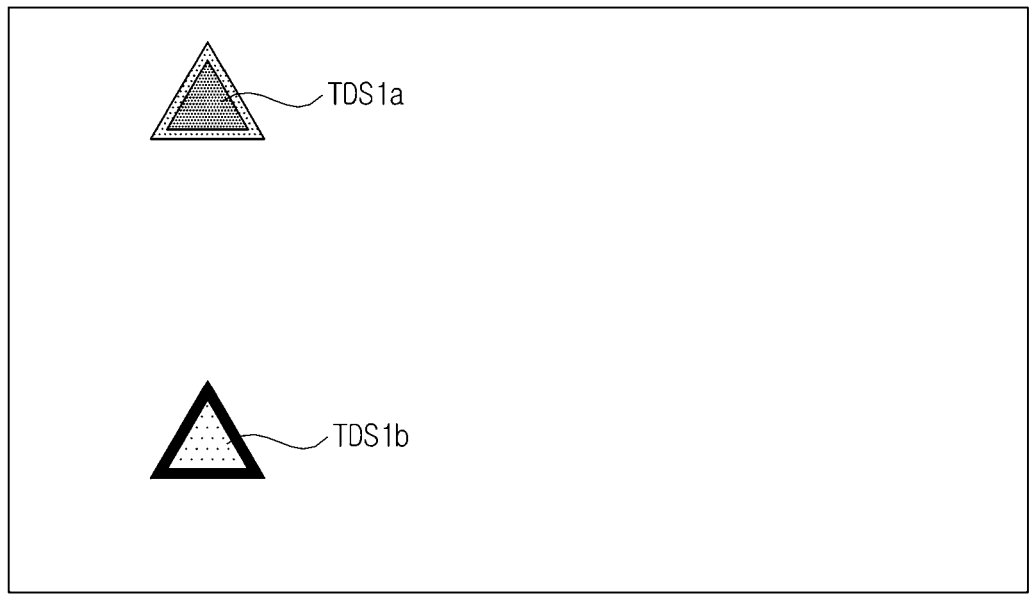
[FIG. 4B]
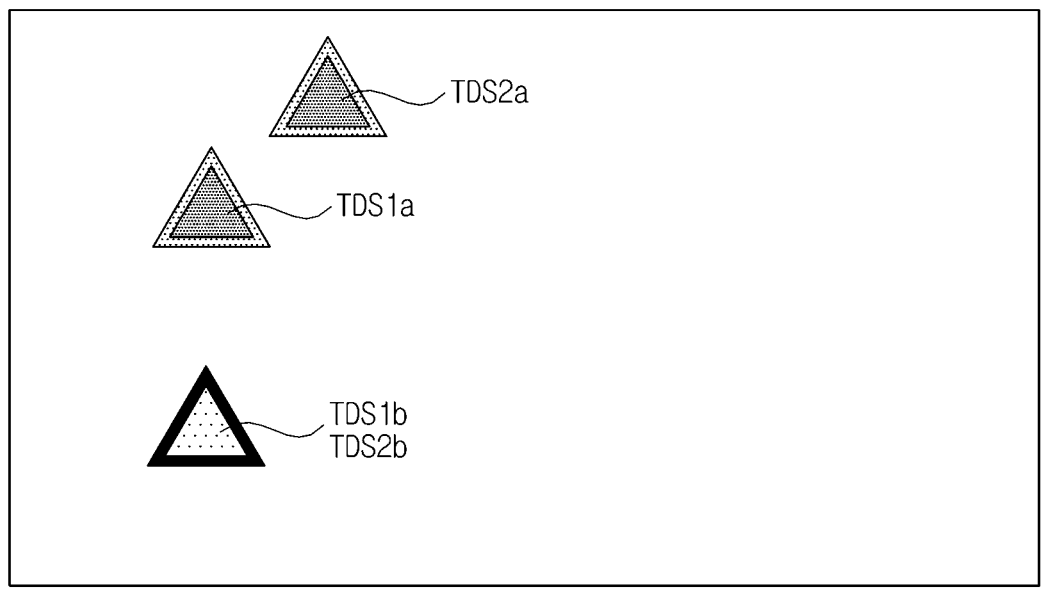

[FIG. 5]
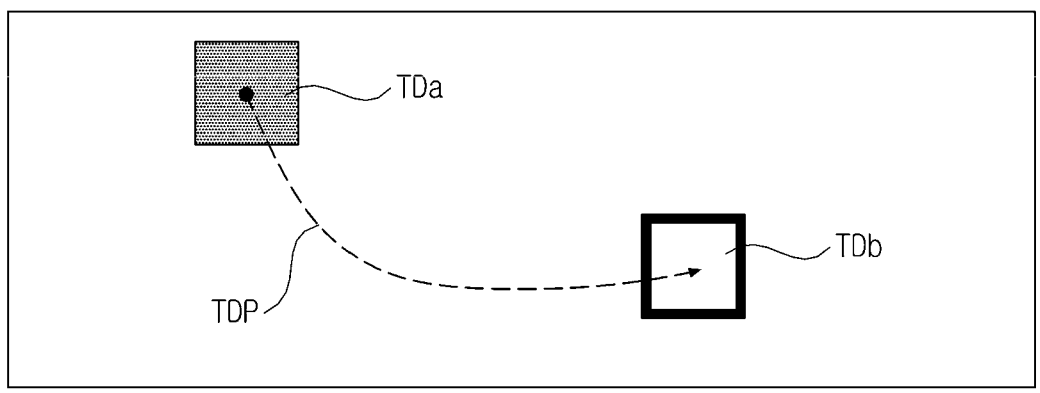

[FIG. 6A]
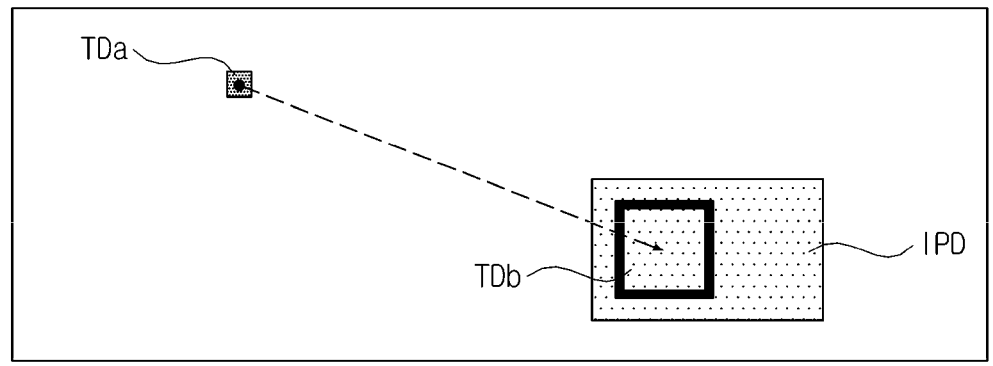
[FIG. 6B]
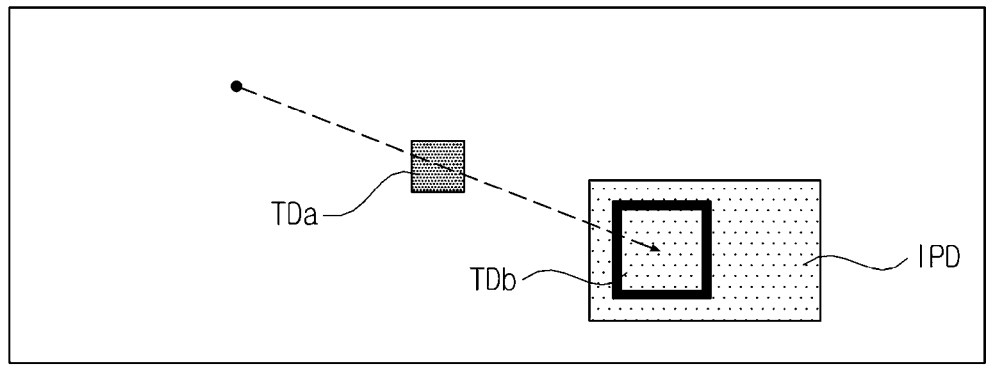
[FIG. 6C]
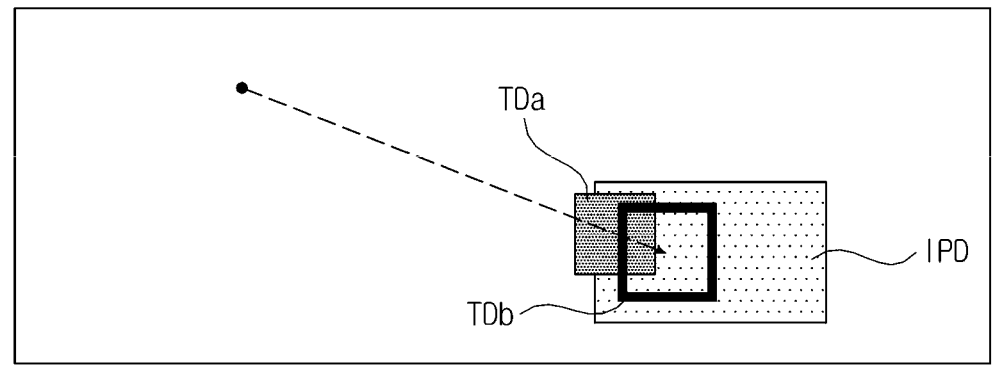

[FIG. 7A]
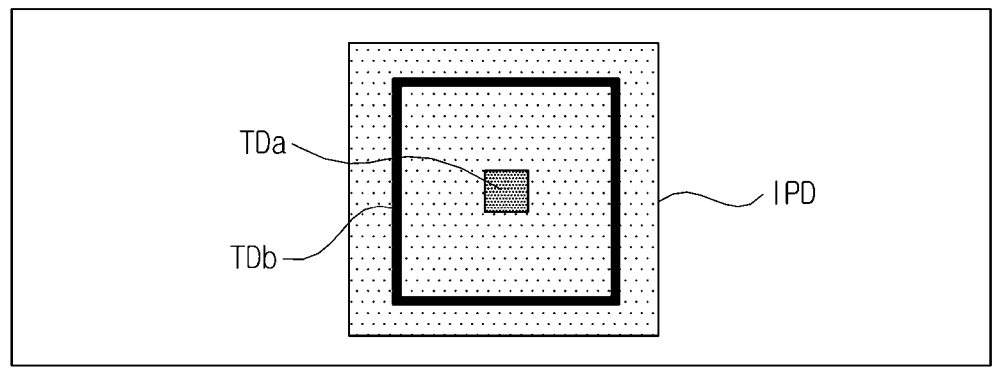
[FIG. 7B]
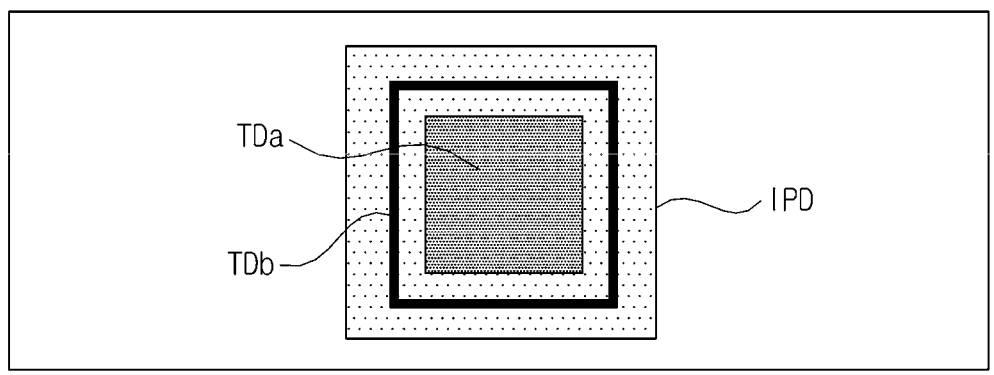
[FIG. 7C]
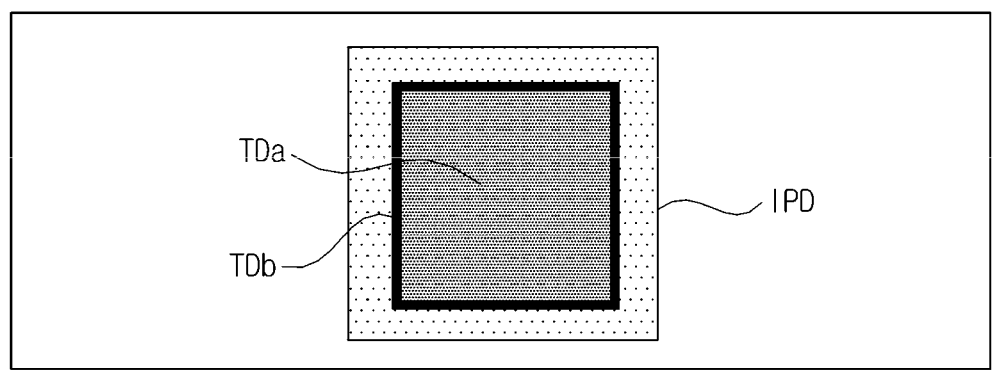

[FIG. 8A]
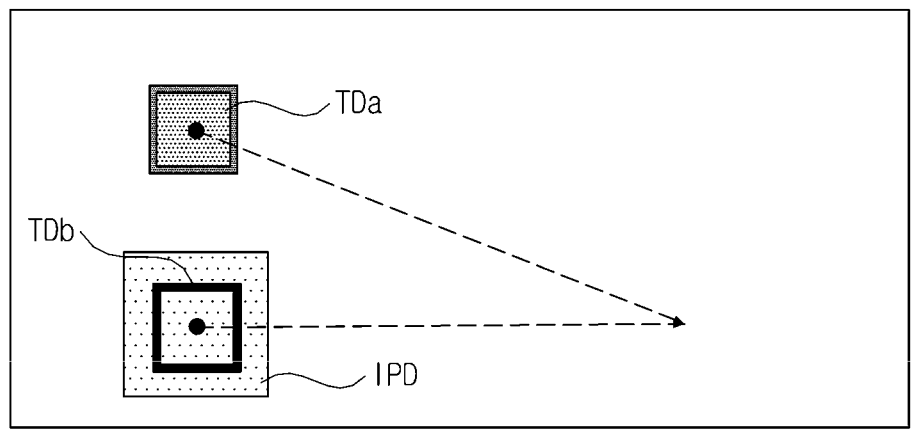
[FIG. 8B]
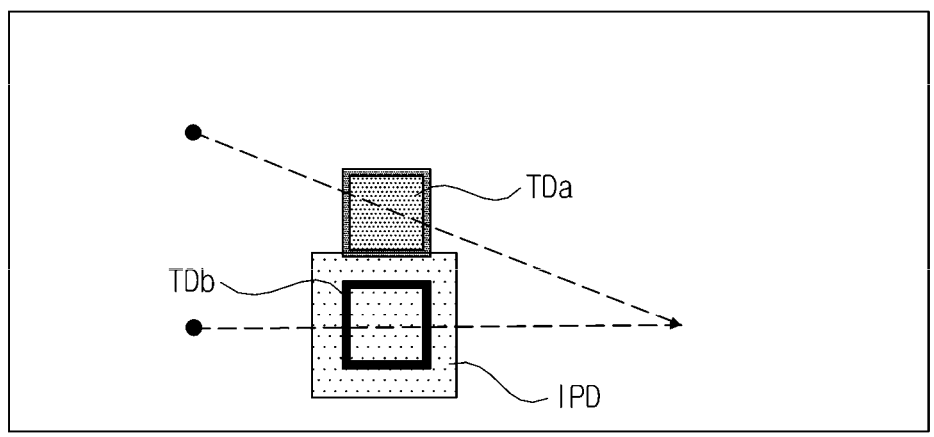
[FIG. 8C]
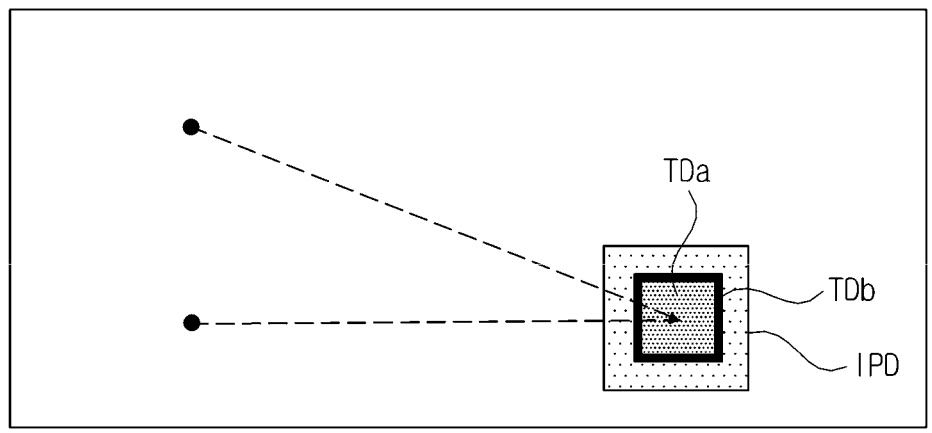

[FIG. 9]
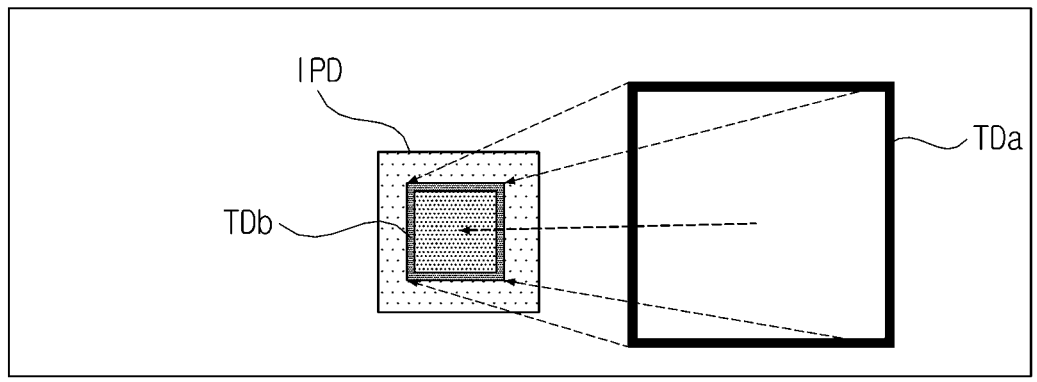
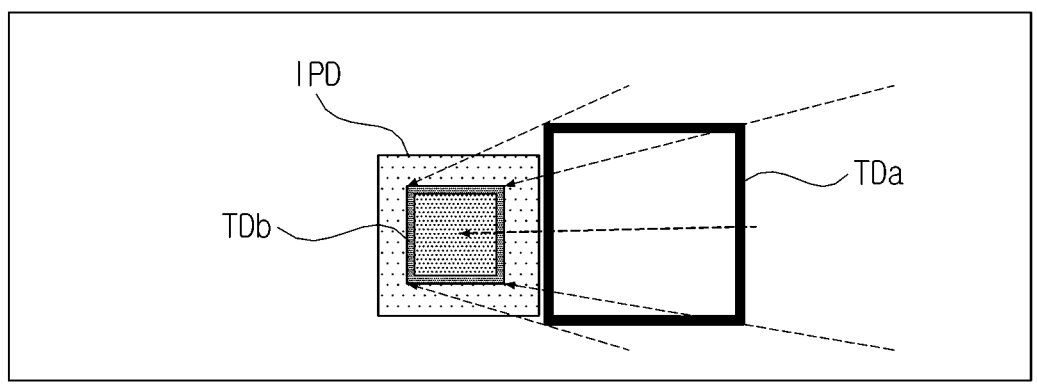
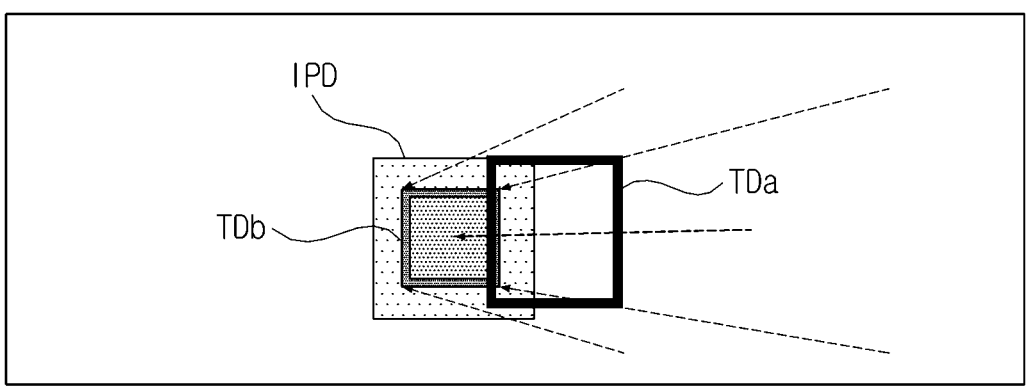

[FIG. 10]
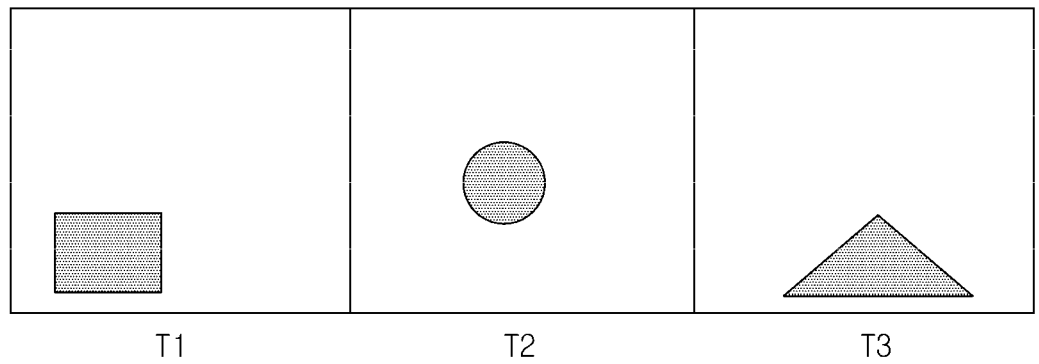

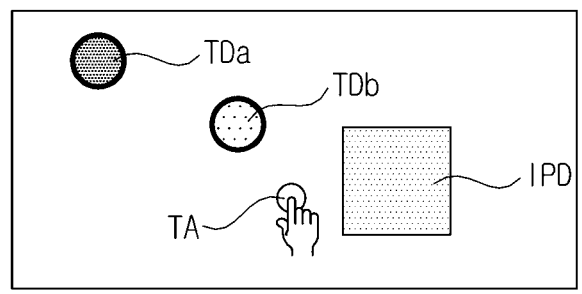
[FIG. 11A]
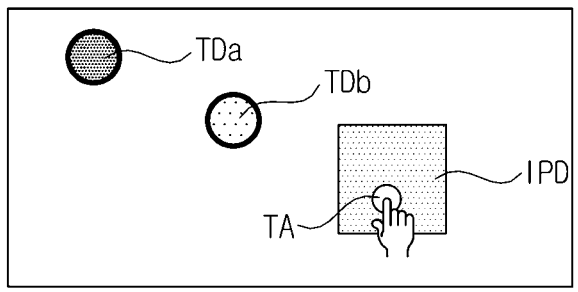
[FIG. 11B]
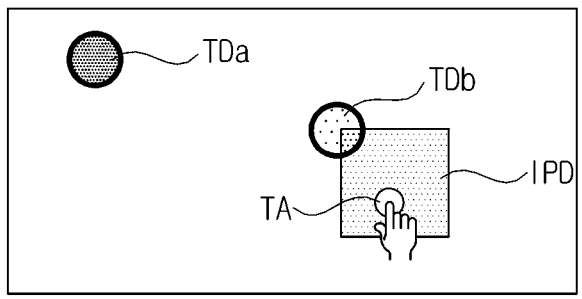
[FIG. 11C]
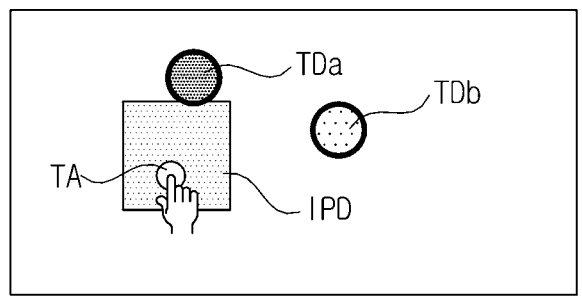
[FIG. 11D]
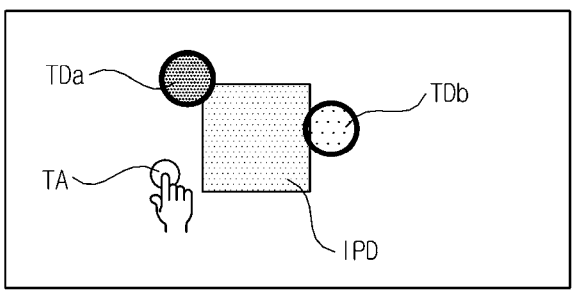
[FIG. 11E]

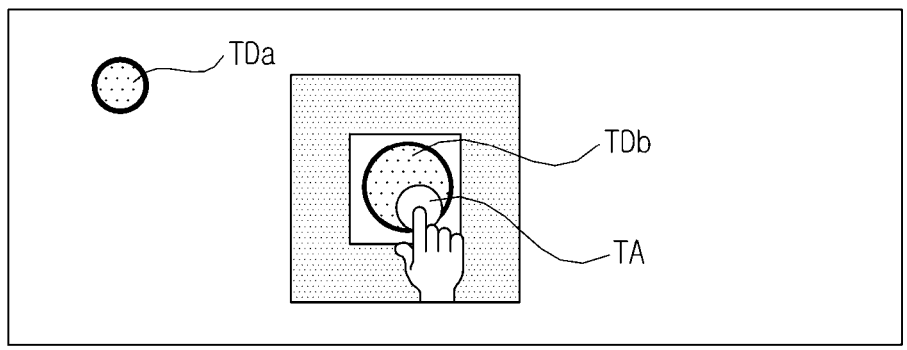
[FIG. 12A]
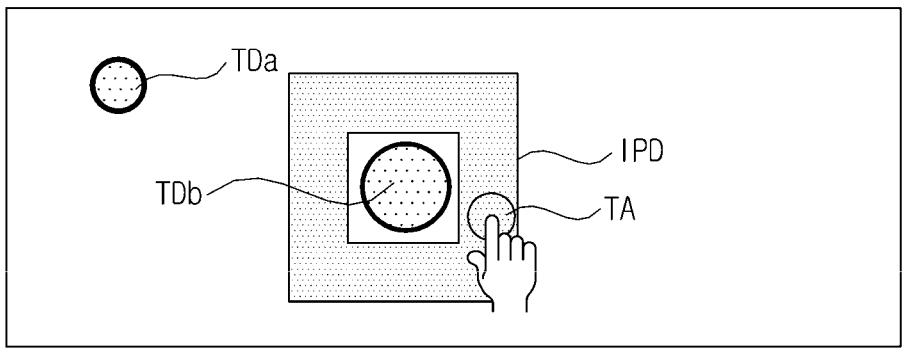
[FIG. 12B]
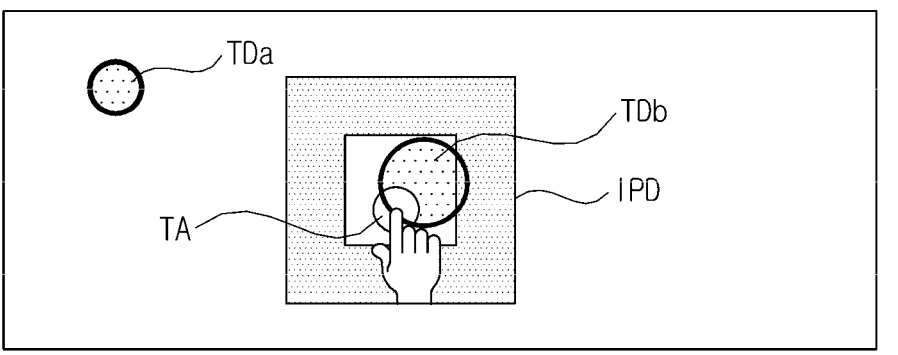
[FIG. 12C]
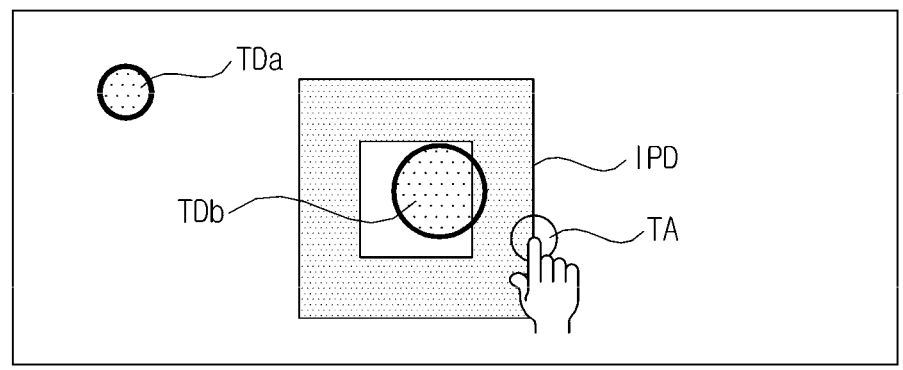
[FIG. 12D]

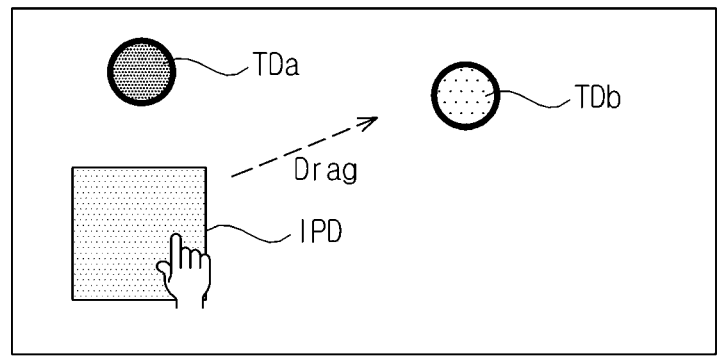
[FIG. 13A]
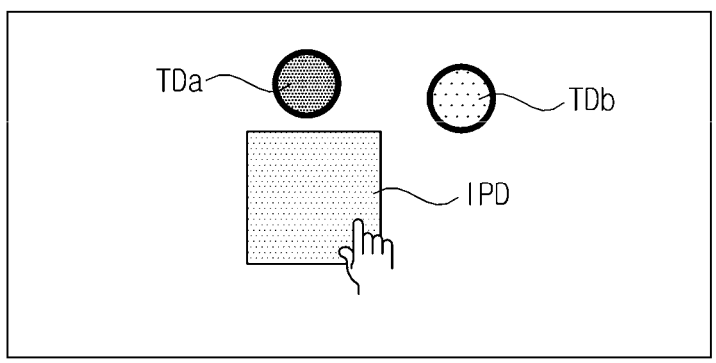
[FIG. 13B]
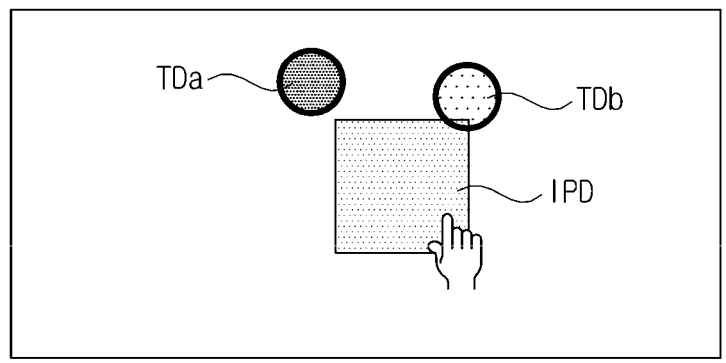
[FIG. 13C]
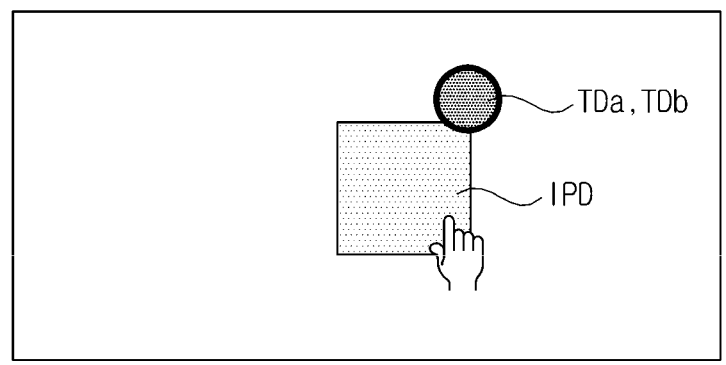
[FIG. 13D]

[FIG. 14A]
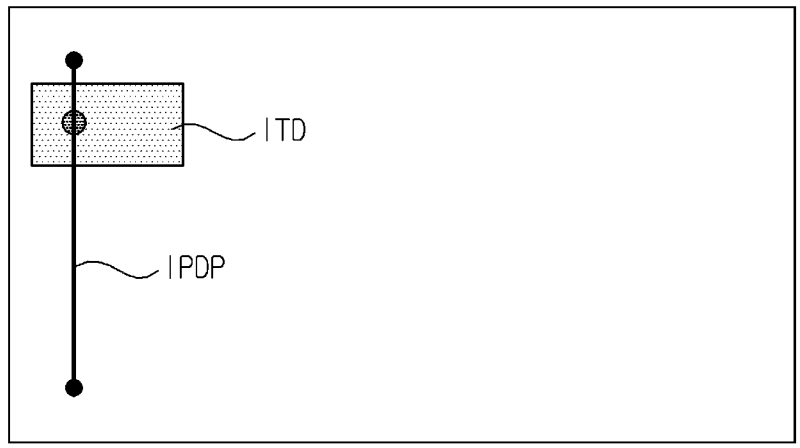
[FIG. 14B]
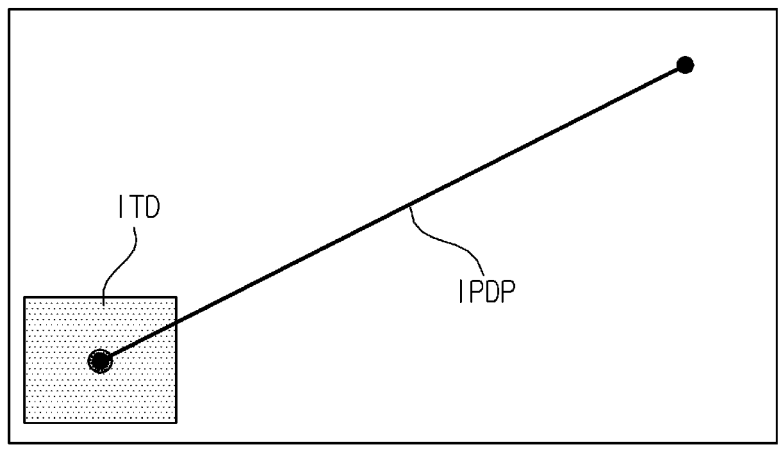
[FIG. 14C]
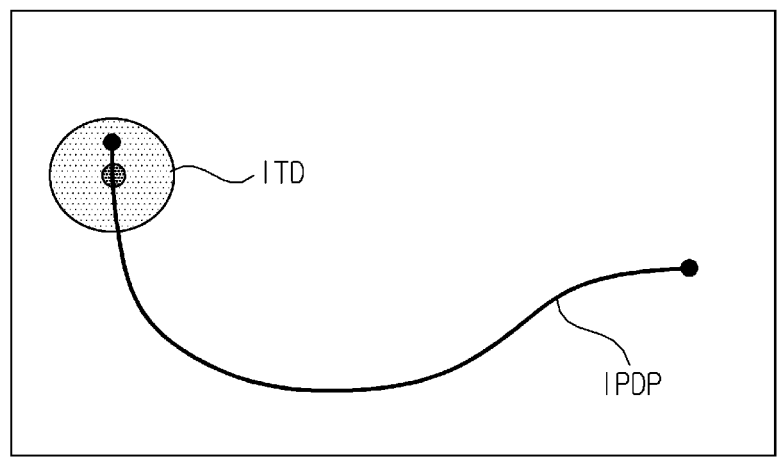

[FIG. 15]
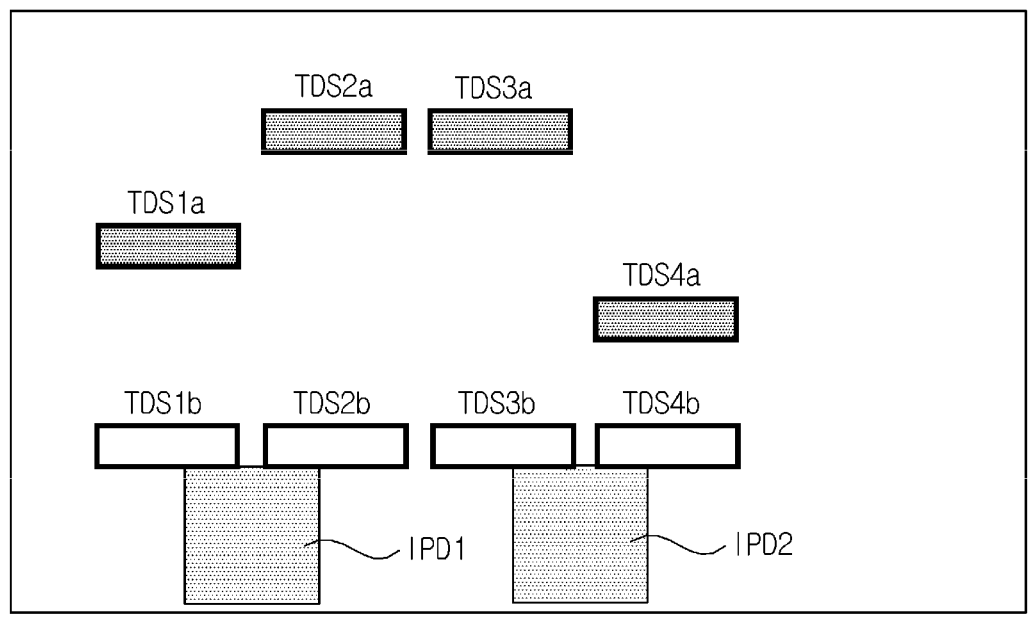

[FIG. 16A]
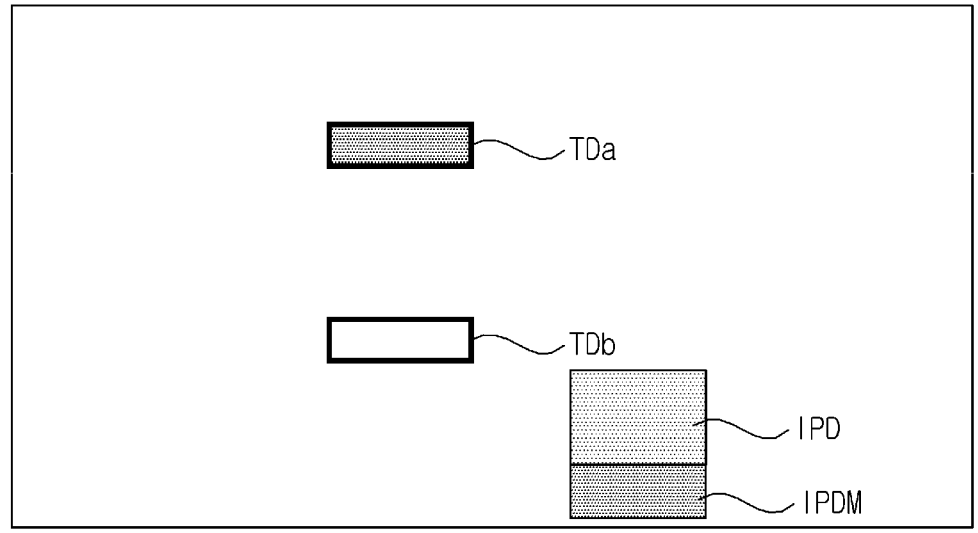
[FIG. 16B]
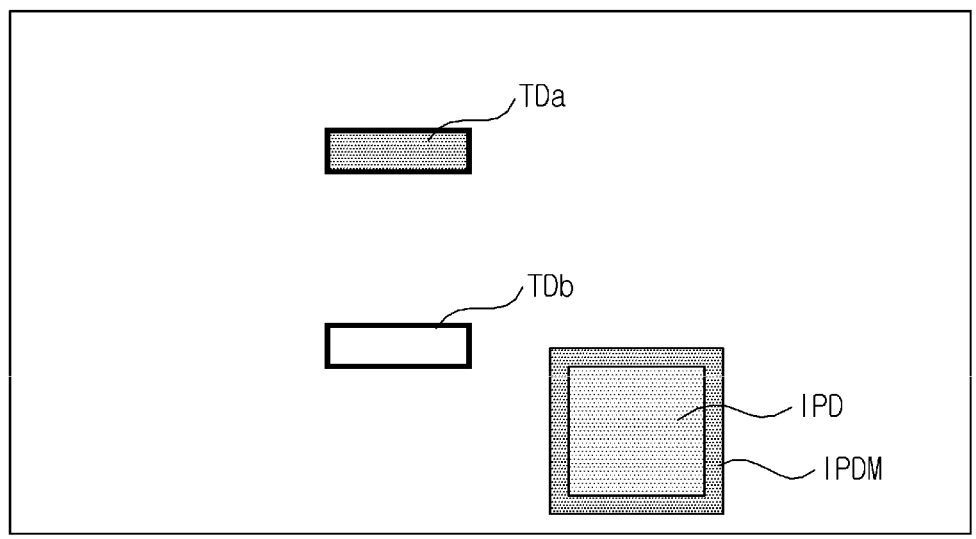

[FIG. 17A]
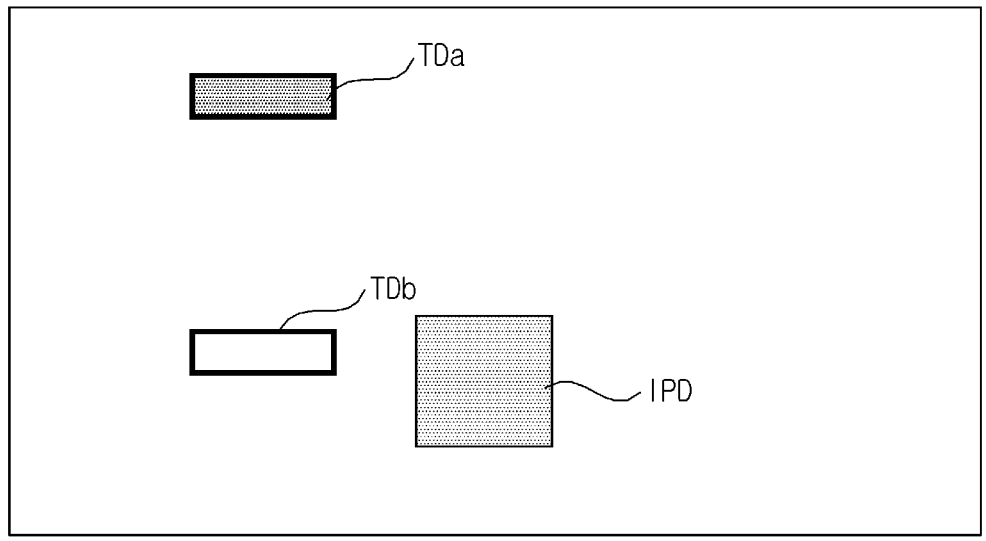
[FIG. 17B]
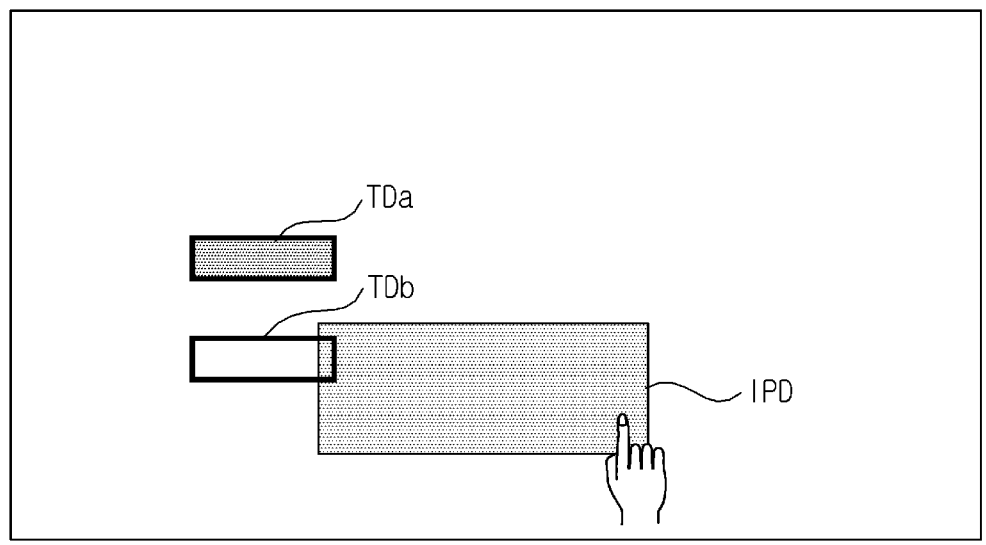

[FIG. 18A]
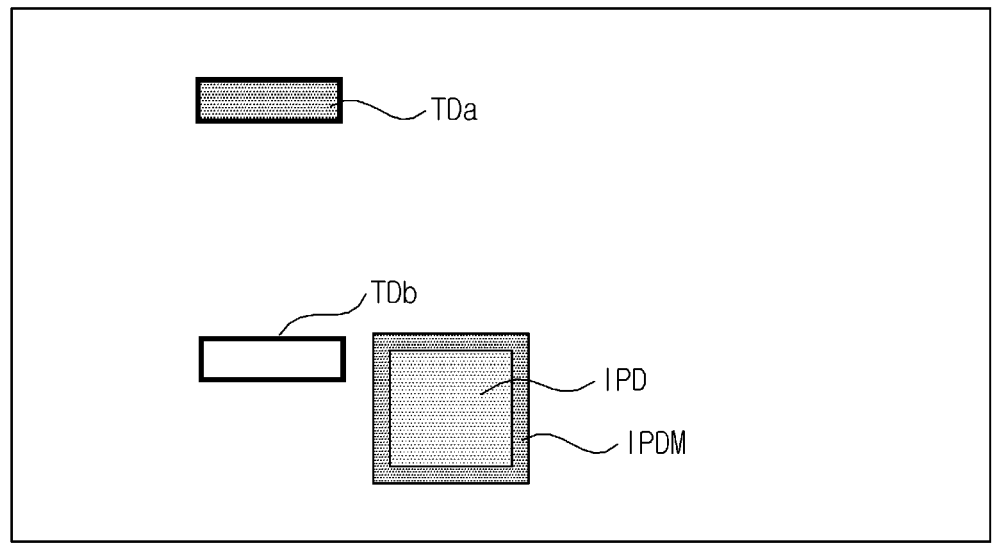
[FIG. 18B]
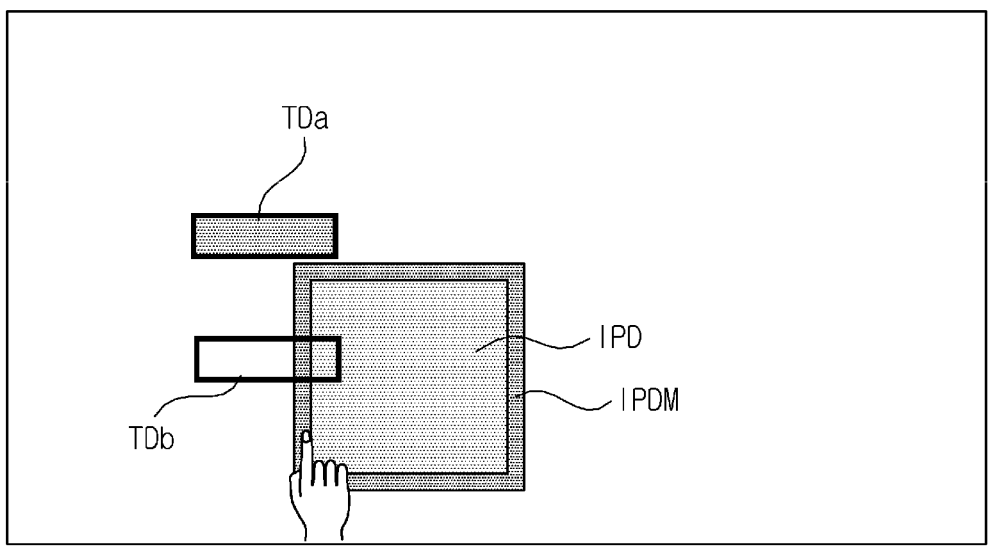

[FIG. 19]
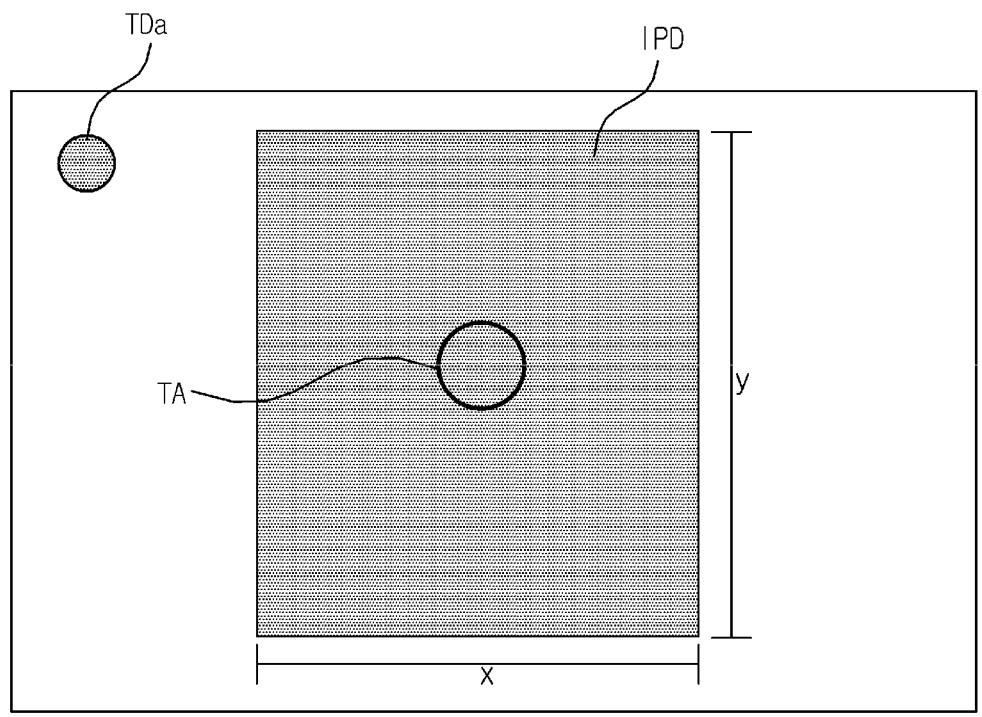
[FIG. 20]
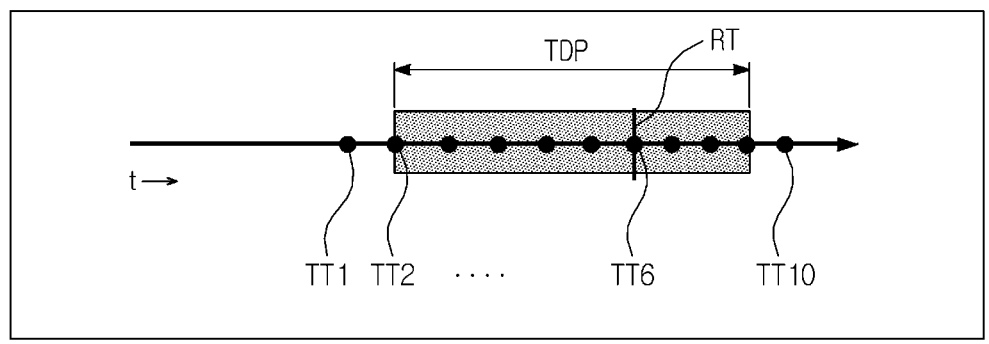

[FIG. 21A]
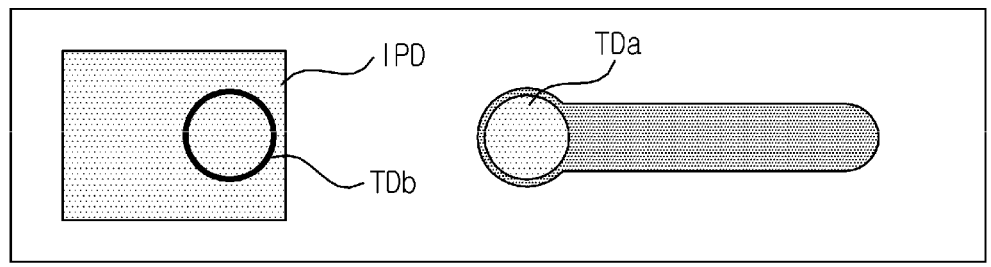
[FIG. 21B]
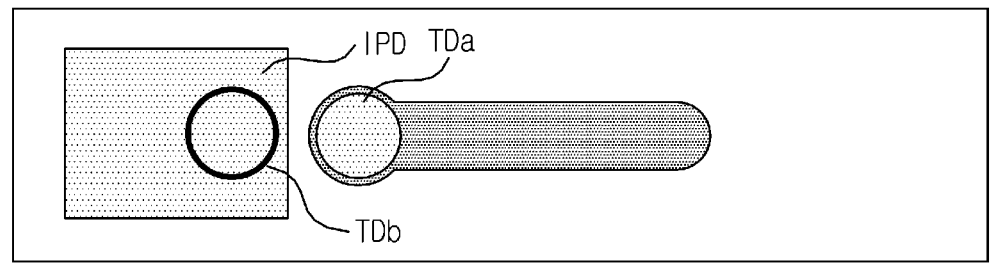
[FIG. 21C]
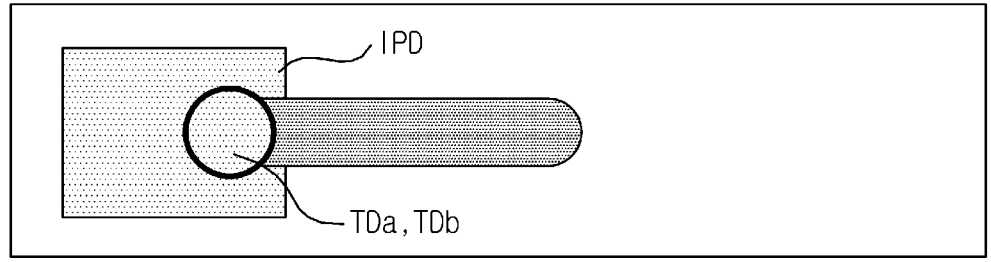
[FIG. 21D]
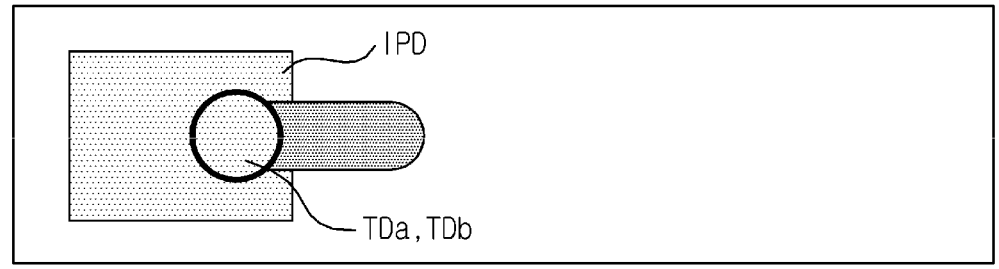

[FIG. 22A]
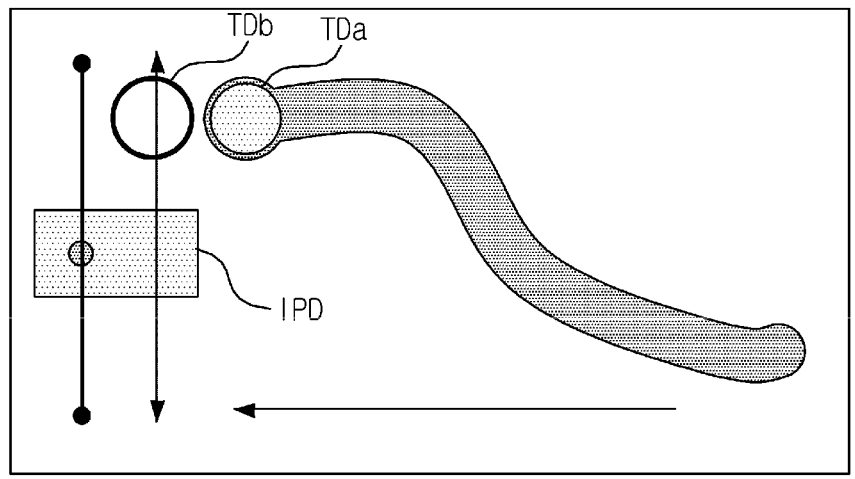
[FIG. 22B]
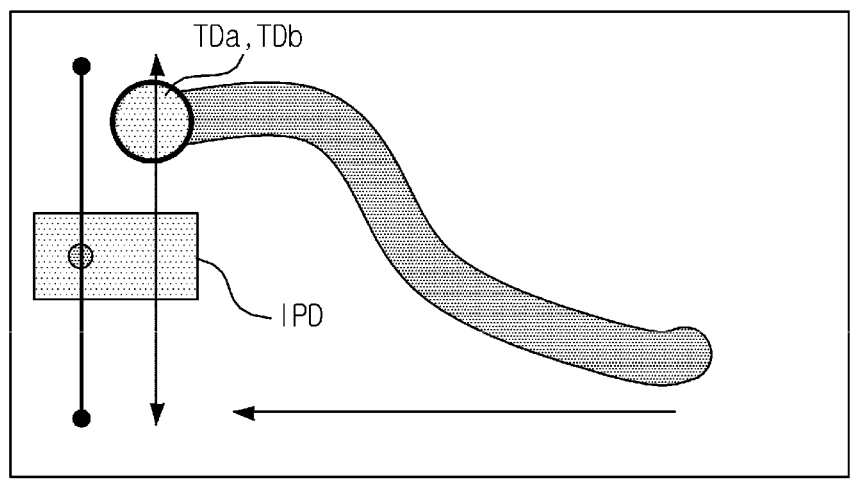
[FIG. 22C]
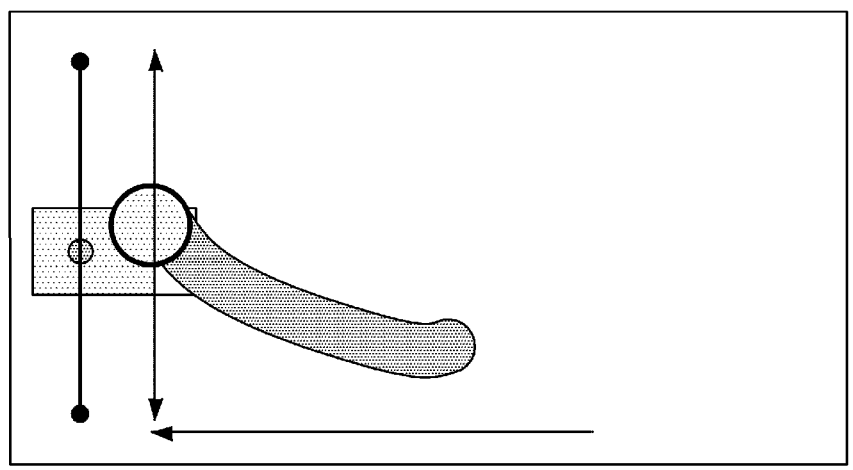

[FIG. 23]
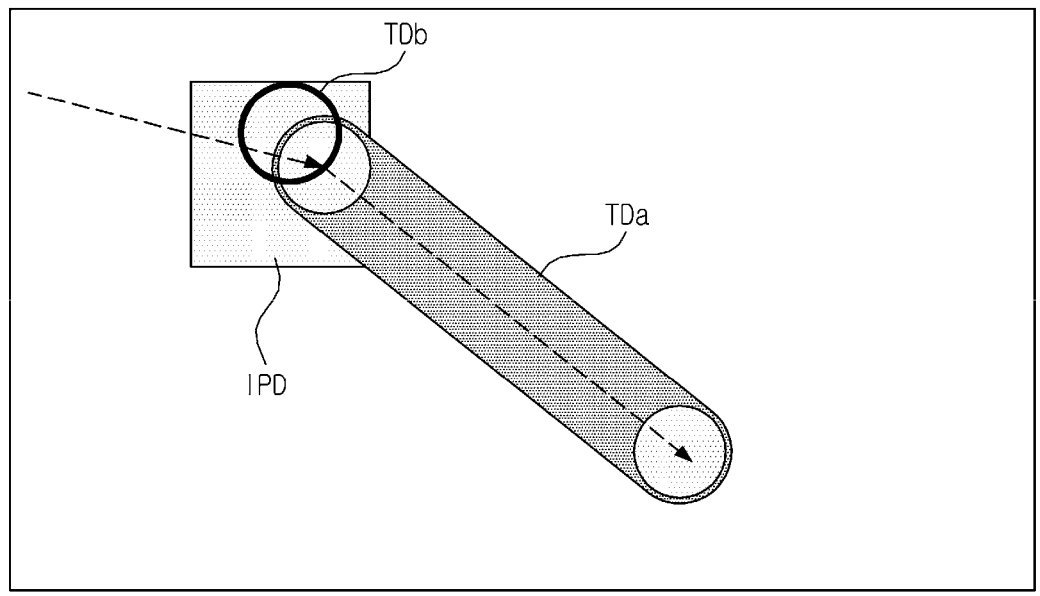
[FIG. 24]
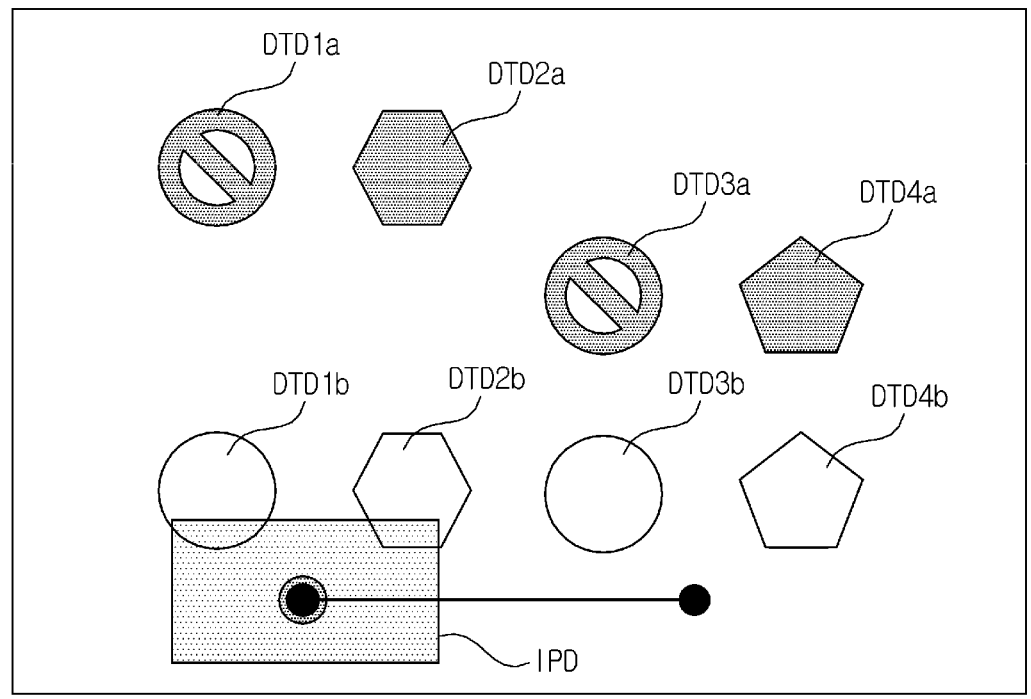

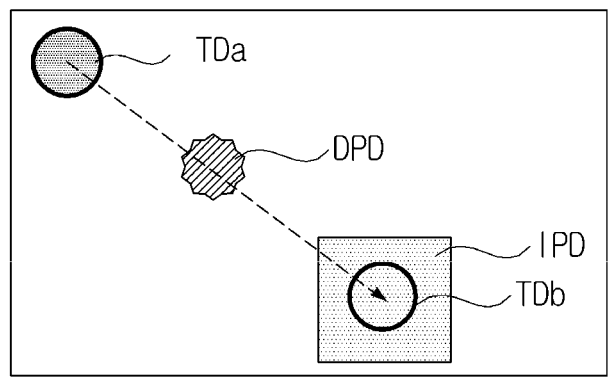
[FIG. 25A]
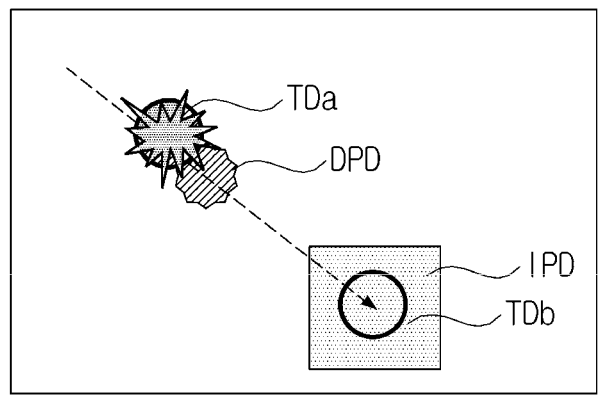
[FIG. 25B]
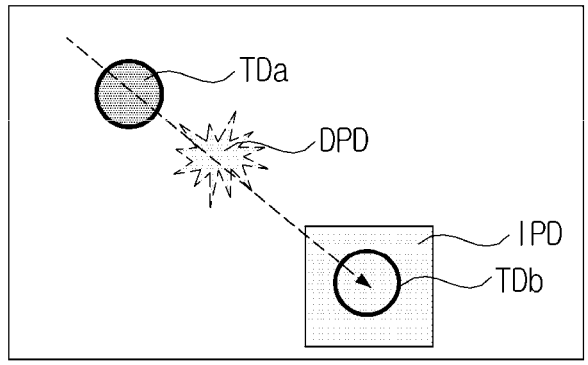
[FIG. 25C]
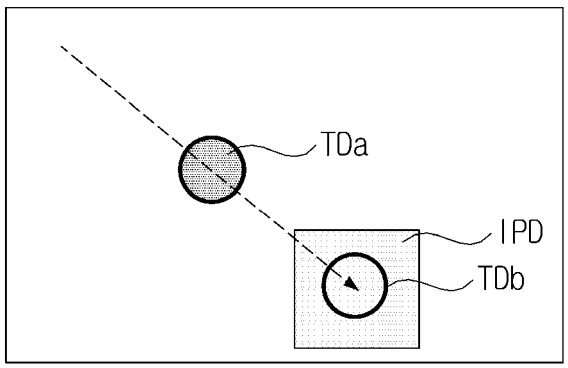
[FIG. 25D]

[FIG. 26]
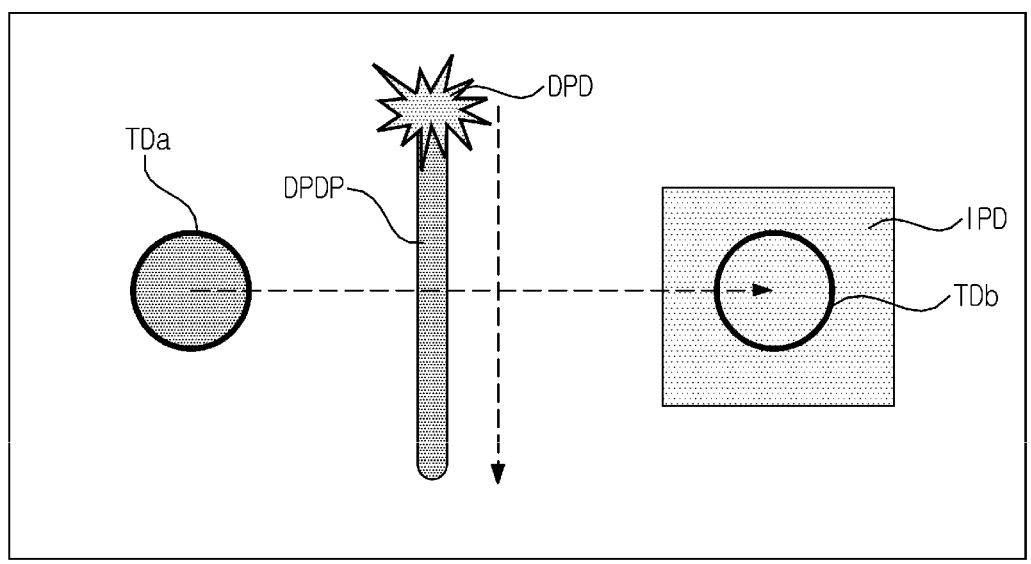

[FIG. 27]
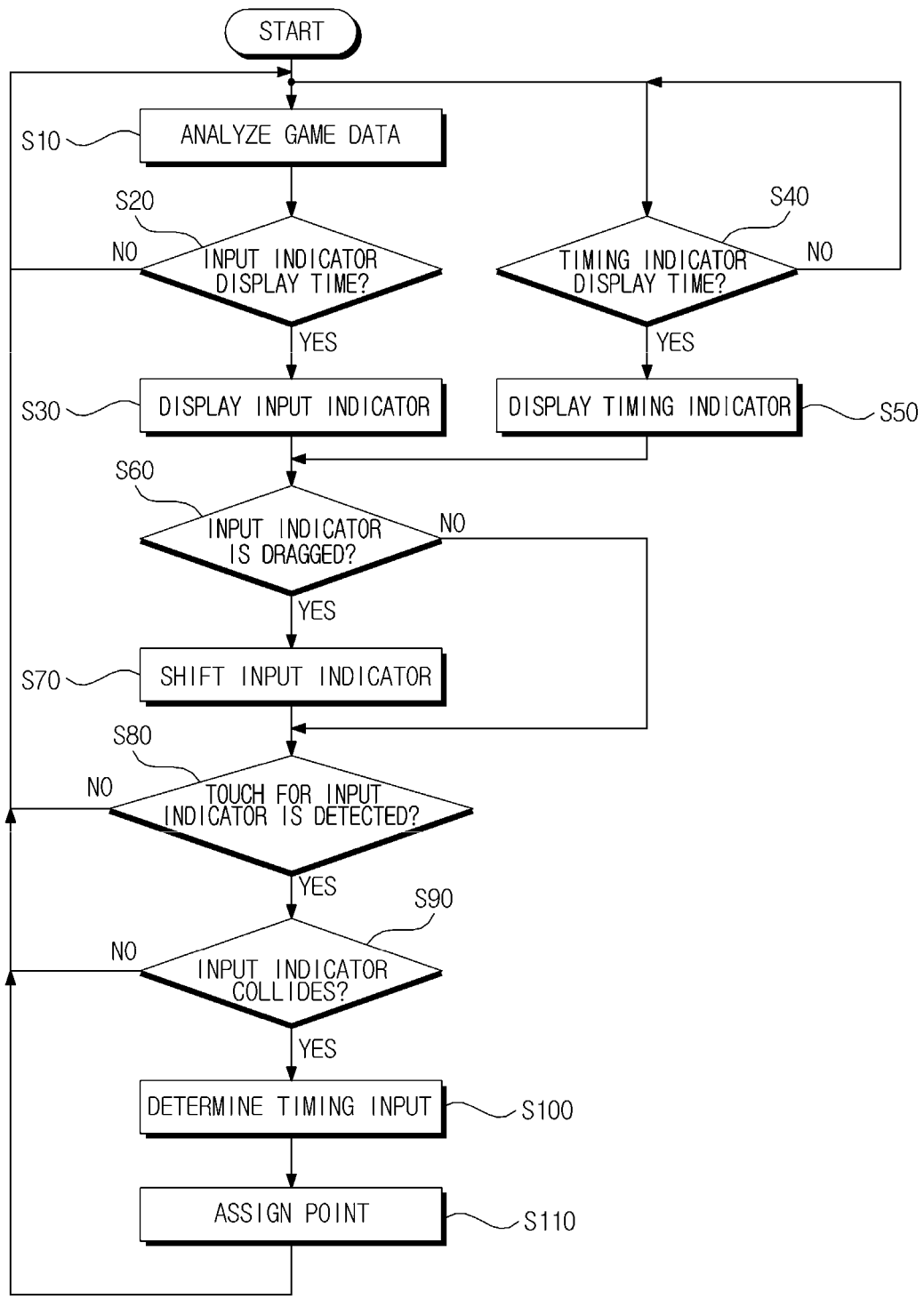

APPARATUS AND METHOD OF PROVIDING TIMING GAME BASED ON TOUCH

CROSS-REFERENCE TO RELATED APPLICATIONS

This application is a U.S. National Stage of International Application No. PCT/KR2016/002881, filed on Mar. 22, 2016, which claims priority to and the benefit of Korean Patent Application No. 10-2015-0040084 and Korean Patent Application No. 10-2015-0074314 filed in the Korean Intellectual Property Office on Mar. 23, 2015 and May 27, 2015, the entire contents of which are incorporated herein by reference.

TECHNICAL FIELD

The present invention relates to an apparatus and a method for providing a timing game, and particularly, to an apparatus and a method for providing a timing game based on a touch for a touch interface device.

BACKGROUND ART

According to the development of an information and communication device, various kinds of user terminals have been released, and among them, a supply of a user terminal having a touch-based user interface, which includes a touch panel or a touch screen and detects a touch of a user as an input, is sharply increased.

In the touch-based timing game which matches a predetermined timing in the related art, a timing indicator and a determination indicator, which serve as guides so as to enable a user to recognize touch timing, are displayed according to a predetermined game scenario. Further, during the progress of the timing game, the display timing indicator moves toward the determination indicator, and the coordinates of the timing indicator and the determination indicator are matched to each other at the designated timing, thereby enabling the user to recognize touch timing and input a touch.

In this case, the user touches the timing indicator and the determination indicator of which the coordinates are matched. However, at the moment when the user lays a finger at a position of the determination indicator or touches the determination indicator in advance, there is a problem in that the finger of the user visually hides the positions of the timing indicator and the determination indicator which are important information in the timing game. That is, there is a problem in that it is difficult to visually confirm accurate timing at which the user needs to actually input a touch.

In order to solve the problem, the determination indicator and the timing indicator may also be displayed larger than the finger making the touch. However, when the sizes of the determination indicator and the timing indicator are increased, the number of indicators disposable on a screen of the user terminal having a designated size is limited, and an interval between the disposed indicators is decreased, so that it is difficult to provide various forms of game experience.

DISCLOSURE

Technical Problem

An object of the present invention is to provide an apparatus for providing a timing game based on a touch, which displays a timing indicator set and a separate input indicator in a touch-based timing game and enables a user to accurately identify timing visually guided by the timing indicator set, and provides a user with the new type of game progress method by utilizing the input indicator.

Another object of the present invention is to provide a method of providing a timing game based on a touch for achieving the foregoing object.

Technical Solution

According to an exemplary embodiment of the present invention, an apparatus for providing a timing game based on a touch includes: a user interface unit which includes one or more contact sensors, detects whether a user inputs a touch and a touch position and generates a detection signal, and outputs a game image; and a game control unit which controls one or more timing indicator sets indicating touch timing of the user and one or more input indicators indicating a touch region to be touched by the user in the user interface unit to be included in the game image by analyzing pre-stored game data, determines whether the detection signal is a timing input or a touch input according to whether one or more timing indicators between two timing indicators included in the one or more timing indicator sets collide with the input indicator when the detection signal is applied from the user interface unit, and configures an image according to a time point of the generation of the timing input, outputs the configured image through the user interface unit, and assigns a point when the detection signal is determined as the timing input.

According to another exemplary embodiment of the present invention, a method of providing a timing game based on a touch of an apparatus for providing a timing game based on a touch, the apparatus including a user interface unit and a game control unit, includes: analyzing, by the game control unit, pre-stored game data, displaying a game image through the user interface unit, and obtaining timing indicator set data and input indicator data; setting, by the game control unit, time, positions, and forms, in which one or more timing indicator sets indicating touch timing of a user and one or more input indicators indicating a touch region that is to be touched by the user in the user interface are to be displayed on the game image based on the timing indicator set data and the input indicator data, and generating timing indicator information and input indicator information; inserting, by the game control unit, the one or more timing indicator sets including two timing indicators to the game image according to the timing indicator information; inserting, by the game control unit, the one or more input indicators to the game image according to the input indicator information; when a detection signal for a touch of the user is applied from the user interface unit, determining whether the detection signal is a timing input or a touch input according to whether one or more timing indicators between the two timing indicators included in the one or more timing indicator sets collide with the input indicator; and when the detection signal is determined as the timing input, assigning a point according to a time point of a generation of the timing input.

Advantageous Effects

Accordingly, the apparatus and the method of providing the timing game based on the touch of the present invention provide a user with the input indicator guiding a region, which a user is to touch, separately from the timing indicator set formed of the plurality of timing indicators guiding touch timing, thereby enabling the user to visually confirm accurate touch timing indicated by the timing indicator set.

Further, the input indicator may be shifted together, as well as the touch indicator, so that the present invention may provide a new game progress method, which has not been provided in an existing touch-based timing game. Particularly, the present invention enables a user to directly operate and shift the input indicator, thereby enabling the user to experience a more various and intensified game.

In addition, the present invention provides the new form of indicator, such as the input prohibition-type timing indicator and the shift path obstacle, thereby increasing a user's interest in the game.

DESCRIPTION OF DRAWINGS

FIG. 1 is a diagram illustrating a configuration of an apparatus for providing a timing game based on a touch according to an exemplary embodiment of the present invention.

FIGS. 2A to 5 are diagrams illustrating examples of a timing indicator.

FIGS. 6A to 9 are diagrams illustrating examples of an input indicator displayed together with a timing indicator.

FIG. 10 is a diagram illustrating various forms of the input indicator.

FIGS. 11A to 12D are diagrams illustrating examples of a timing input by using the input indicator of the present invention.

FIGS. 13A to 13D are diagrams illustrating another example of a timing input by using the input indicator of the present invention.

FIGS. 14A to 14C are diagrams illustrating a case where a shift path of the input indicator is designated.

FIG. 15 is a diagram illustrating a case where the input indicator is formed so as to correspond to the plurality of timing indicator sets.

FIGS. 16A and 16B are diagrams illustrating another example of the input indicator.

FIGS. 17A to 18B are diagrams illustrating another example of the input indicator.

FIG. 19 is a diagram illustrating another utilization example of the input indicator.

FIG. 20 is a diagram illustrating an example of touch designation timing for determining a timing input.

FIGS. 21A to 21D are diagrams illustrating an example of an input continuation-type timing indicator.

FIGS. 22A to 23 are diagrams illustrating other examples of the input continuation-type timing indicator.

FIG. 24 is a diagram illustrating an example of an input prohibition-type timing indicator.

FIGS. 25A to 25D are diagrams illustrating an example of a shift path obstacle.

FIG. 26 is a diagram illustrating another example of the shift path obstacle.

FIG. 27 is a diagram illustrating a method of providing a timing game based on a touch according to an exemplary embodiment of the present invention.

BEST MODE

The present invention, an operational advantage of the present invention, and an object achieved through the implementation of the present invention will be fully understood through the reference of the accompanying drawings exemplifying an exemplary embodiment of the present invention and contents described in the drawings.

Hereinafter, the present invention will be described in detail by describing an exemplary embodiment of the present invention with reference to the accompanying drawings. However, the present invention may be implemented in various different ways, and is not limited to the exemplary embodiments to be described below. Further, in order to clearly describe the present invention, parts irrelevant to the description are omitted, and the same reference number refers to the same member in the drawings.

Throughout the specification and the claims, unless explicitly described to the contrary, the word "comprise" and variations such as "comprises" or "comprising" will be understood to imply the inclusion of stated elements but not the exclusion of any other elements. In addition, the terms "-er", "-or", "module", and "block" described in the specification mean units for processing at least one function and operation and can be implemented by hardware components or software components and combinations thereof.

FIG. 1 is a diagram illustrating a configuration of an apparatus for providing a timing game based on a touch according to an exemplary embodiment of the present invention.

Referring to FIG. 1, an apparatus for providing a timing game based on a touch according to an exemplary embodiment of the present invention includes a touch detecting unit 100, an image output unit 200, and a game control unit 300.

The touch detecting unit 100 includes at least one contact sensor, and detects whether a user inputs a touch and a position of a touch and transmits a detection signal to the game control unit 300.

The image output unit 200 may be implemented as a display device, and displays an image applied from the game control unit 300 to the user. In the present invention, the image output unit 200 displays an input indicator corresponding to the timing indicator set together, separately from a timing indicator set formed of the plurality of timing indicators on a screen under the control of the game control unit 300.

The touch detecting unit 100 and the image output unit 200 may be implemented with separate devices, but in general, the touch detecting unit 100 and the image output unit 200 may be implemented as one combined device, like a touch screen.

Although not illustrated, the apparatus for providing the timing game based on the touch of the present invention may further include a sound output unit (not illustrated) in addition to the image output unit 200. The sound output unit may be implemented with a sound output device, such as a speaker, to enable the apparatus for providing the timing game based on the touch to provide the user with a sound, as well as an image.

The touch detecting unit 100, the image output unit 200, and the sound output unit (not illustrated) may be considered as user interface units that interface with the user.

The game control unit 300 configures a game image, in which at least one timing indicator set and at least one input indicator corresponding to the timing indicator set are displayable according to a pre-stored game setting, and transmits the game image to the image output unit 200 to be displayed to the user, and receives a detection signal from the touch detecting unit 100 and analyzes the detection signal. Further, the game control unit 300 transmits a result of the analysis to the image output unit 200 again and displays whether the touch of the user is made in a designated region at the predetermined timing.

The game control unit 300 includes a memory unit 310, an image configuring unit 320, a timing indicator control unit 330, an input indicator control unit 340, a collision determining unit 350, and a touch determining unit 360.

The memory unit 310 pre-stores game data required for the progress of the game. Timing, positions, forms, and the like in which the timing indicator set and the input indicator are to be displayed are stored as game data in the memory unit 310, together with image data and sound data, such as a game background image or a background music, to be displayed through the image output unit 200, during the progress of the game.

The image configuring unit 320 may receive the image data, such as a game background image, from the memory unit 310 and configures an image to be output to the user, and transmits the image to the image output unit 200. Further, when timing indicator information is received from the timing indicator control unit 330, the image configuring unit 320 includes a timing indicator set when the image to be transmitted to the image output unit 200 is configured according to the received timing indicator information, and when input indicator information is received from the input indicator control unit 340, the image configuring unit 320 includes a timing indicator set.

Further, the image configuring unit 320 may receive information on the result of the determination on the touch of the user from the touch determining unit 360, and display the result of the determination on a screen.

The timing indicator control unit 330 obtains timing indicator set data from the game data stored in the memory unit 310 and sets a time, a position, and a form, in which at least one timing indicator set is to be displayed on a screen according to the obtained timing indicator set data to generate timing indicator information. Then, the timing indicator control unit 330 transmits the generated timing indicator information to the image configuring unit 320.

In the present invention, the timing indicator set is configured so that two timing indicators make one pair. The timing indicator control unit 330 may also control two timing indicators of the timing indicator set to be displayed on the screen at the same time, and may also control two timing indicators to be displayed at different times, respectively.

Herein, the timing indicator set means a set of timing indicators, in which two timing indicators are disposed while overlapping at the same position with the same size at predetermined touch designation timing during the progress of the game to enable the user to recognize the touch designation timing. The plurality of timing indicator sets may be displayed at the same time. However, the timing indicators included in the different timing indicator sets may be set so as not to overlap one another at the same time, at the same position, and with the same size during the progress of the game, in order to prevent the user from miss-recognizing the timing indicators. However, one timing indicator in each of the plurality of different timing indicator sets may be displayed at the same position, with the same size, and in the same form. For example, when the two timing indicator sets are displayed on the screen, one timing indicator of one timing indicator set and one timing indicator in the other timing indicator set may be displayed while overlapping. According to an aspect, the configuration of one timing indicator set with the plurality of timing indicators may be considered, but in the present invention, it is described that each timing indicator set indicates one touch timing, and even though the timing indicator having the same form in the same region is used, another timing indicator set indicates another touch timing again, so that the timing indicator set is set to be formed of two timing indicators.

Further, the timing indicator control unit 330 may control the position, the size, and the shape of the timing indicator to be changed over time after the timing indicator is displayed on the screen. That is, the timing indicator may be controlled to be shifted from a position, at which the timing indicator is initially displayed, and a size or a shape of the timing indicator may also be varied. In this case, the size, the form, and the shift path of the timing indicator may be variously set. Further, each of the plurality of timing indicators of the timing indicator set may be expressed in different forms, and at least one of the plurality of timing indicators of the timing indicator set may be implemented only with a contour line or may also be implemented to be internally transparent or semi-transparent so as for the user to visually and easily recognize the timing indicator when the timing indicators overlap one another.

Further, one timing indicator between two timing indicators of the timing indicator set may also be displayed in a line form so as to display continuation-type touch timing, as well as momentary touch timing. The timing indicator displayed in the line form may be called an input continuation-type timing indicator.

In the meantime, the input indicator control unit 340 obtains input indicator data from the game data stored in the memory unit 310, sets a time, a position, and a form, in which at least one input indicator is to be displayed on the screen, according to the obtained input indicator data, generates input indicator information, and transmits the generated input indicator information to the image configuring unit 320.

Herein, the input indicator is an indicator representing a touch region which the user will actually touch during the progress of the game, and is displayed on a screen in response to at least one timing indicator set. The input indicator control unit 340 may also control the input indicator to be displayed together with the corresponding timing indicator set at the same time, but may control the input indicator to be displayed before or after the display of the timing indicators set. However, when two timing indicators of at least one timing indicator set overlap, that is, the timing indicator set indicates touch timing of the user, the input indicator essentially needs to be displayed so as to allow the user to touch the input indicator.

Further, the input indicator may also be displayed so as to correspond only to one timing indicator set, but may also be controlled so as to correspond to the plurality of timing indicator sets. For example, when the input indicators may also be displayed with the number corresponding to each of the plurality of timing indicator sets, but only one input indicator may also be displayed while the plurality of timing indicator sets is sequentially displayed with a time interval. This means that one input indicator may correspond to the plurality of timing indicator sets.

The position, the size, and the form of the input indicator may be variously adjusted regardless of the timing indicator, and a partial region of the input indicator may also overlap at least one timing indicator of the corresponding timing indicator set. Depending on a case, a region of the timing indicator may be included within a region of the input indicator or may partially overlap the region of the input indicator. However, when the timing indicator is included within the input indicator, the input indicator may be displayed to be larger than the timing indicator so as to enable the user to visually sufficiently confirm the input indicator and the timing indicator. Further, the input indicator may be controlled to be shifted. In this case, the input indicator control unit 340 may also control the input indicator to be shifted along a predetermined path, and depending on a case, the input indicator control unit 340 may control the input indicator to be shifted together with one timing indicator in the corresponding timing indicator set.

Further, depending on a case, the input indicator control unit 340 may receive a detection signal from the touch detecting unit 100 and vary a position of the input indicator. For example, when the user touches an input indicator displayed on the user interface unit and drags the input indicator, the input indicator control unit 340 may detect the drag as a position change of a detection signal, and shift a position of the input indicator or vary a size or a form of the input indicator according to the drag position. This may provide the user with the different and new type of timing game based on a touch, which is differentiated from an existing timing game based on a touch, in which a user simply touches a designated position at designated timing, by utilizing the input indicator as another element in the timing game based on the touch.

In the present invention, in comparing the timing indicator set including the plurality of timing indicators and the input indicator with the existing timing indicator and determination indicator, the related art is configured so that the determination indicator is touched when the timing indicator and the determination indicator overlap, so that both the timing indicator and the determination indicator are visually hidden when the user inputs a touch and thus the user cannot accurately determine timing.

The plurality of timing indicators of the timing indicator set of the present invention represents only touch timing, and the input indicator represents only a region which needs to be touched. That is, a means displaying touch timing and a means displaying a region which needs to be touched are divided. Accordingly, the user may touch the input indicator displaying a touch region while confirming the timing indicator set displaying touch timing without a visual obstacle.

That is, the apparatus for providing the timing game based on the touch of the present invention displays the function of the determination indicator which simultaneously displays touch timing and a touch region in the existing touch-based timing game with the divided timing indicator and input indicator, so that it is possible to solve the problem of the existing touch-based timing game.

Further, even when the input indicator control unit 340 shifts the position of the input indicator in response to the detection signal, the input indicator control unit 340 may control the input indicator to be shifted only in a designated path. That is, the input indicator control unit 340 allows the user to shift the input indicator, but may restrict the input indicator so that the input indicator does not deviate from a predetermined path.

The collision determining unit 350 receives the timing indicator information and the input indicator information from the timing indicator control unit 330 and the input indicator control unit 340 and analyzes the timing indicator information and the input indicator information, and determines whether the input indicator collides with at least one timing indicator of the corresponding timing indicator set. That is, the collision determining unit 350 determines whether the input indicator overlaps a partial region of the timing indicator. Then, when it is determined that the input indicator collides with at least one timing indicator of the timing indicator set, the collision determining unit 350 transmits a collision signal to the timing determining unit 360. In order to provide the user with the new type of timing game based on a touch by adding the input indicator as an element of the game as described above, the collision determining unit 350 determines whether the input indicator collides with the timing indicator.

The touch determining unit 360 receives the timing indicator information from the timing indicator control unit 330 and analyzes touch designation timing designated by at least one timing indicator set each, and receives the input indicator information from the input indicator control unit 340 and analyzes a touch designation region. Further, the touch determining unit 360 receives the detection signal from the touch detecting unit 100, analyzes touch timing and a touch region, which the user has actually touched, and determines whether the analyzed touch timing and touch region are matched with the touch designation timing and the touch designation region. That is, the touch determining unit 360 determines accuracy of the timing and the position of the user's touch, and transmits determination result information to the image configuring unit 320. The touch determining unit 360 determines whether the user has touched at the touch designation timing and whether the user has touched the touch designation region at the same time.

Herein, the touch designation timing may be designated with a predetermined time interval, not a specific time, and may be designated with a predetermined time interval before and after a reference time designated in the timing indicator information. Further, the touch determining unit 360 may divide the touch designation timing designated with the time interval into a plurality of time intervals again, and may designate the touch designation timing so that a higher point to a time interval closer to a reference time is allocated when determination result information is generated. That is, when accuracy of the touch timing is high, the touch determining unit 360 may determine that the user obtains a higher game point. Further, when a touch of the user is detected at the touch designation timing, but it is determined that the touch region is outside the touch designation region designated with the input indicator, the touch determining unit 360 may determine that the user fails to obtain a game point.

As a result, the apparatus for providing the timing game based on the touch of the present invention divides and displays at least one timing indicator set representing touch timing and the input indicator representing a region to be touched, so that even when the user touches the input indicator, the timing indicator set is not visually hidden, thereby solving inconvenience in using the touch-based timing game. Further, the position, the size, and the form of the input indicator may be adjusted by the user, which is different from the existing touch-based timing game, thereby arousing and maintaining a user's interest in the game.

FIGS. 2A to 5 are diagrams illustrating examples of the timing indicator.

FIG. 2A represents a timing indicator set including two timing indicators, and FIG. 2B represents the plurality of timing indicator sets. As illustrated in FIG. 2A, when the timing indicators in the timing indicator set have the same shape, a user may easily recognize that the timing indicators are included in the same timing indicator set. Further, as illustrated in FIG. 2B, the plurality of timing indicator sets may also be displayed on the screen at the same time. Further, in FIG. 2B, the timing indicators of the plurality of timing indicator set have the same form, but a user may easily determine each of the timing indicator set from a shift direction of the timing indicator. However, when the timing indicators of the plurality of timing indicator set are formed to have different forms, the user may more easily determine the timing indicator sets.

In FIGS. 3A and 3B, it can be seen that the plurality of timing indicators of a timing indicator set have the same form and size, but in order to enable a user to easily recognize touch timing even when the timing indicators of the timing indicator set overlap, some of the timing indicators may be implemented only with a contour line or may be implemented to be internally transparent or semi-transparent. In this case, the timing indicator control unit 330 disposes the timing indicator, which is implemented only with a contour line or is implemented to be internally transparent or semi-transparent, among the overlapping timing indicators, on an upper layer of an opaque timing indicator, thereby preventing the opaque timing indicator from hiding a shape of another timing indicator.

FIGS. 4A and 4B represent the case where some timing indicators in the plurality of timing indicator sets are disposed while overlapping. FIG. 4A represents the state where two timing indicators TDS1*a* and TDS1*b* of one first timing indicator set TDS1 are displayed, and FIG. 4B represents the state where two timing indicators TDS2*a* and TDS2*b* of a second timing indicator set TDS2 are additionally displayed after the first timing indicator set TDS1 is displayed. As illustrated in FIG. 4B, the timing indicator TDS2*b* of the second timing indicator set TDS2 is displayed at the same position in the same form as those of the timing indicator TDS1*b* of the first timing indicator set TDS1 while overlapping the timing indicator TDS1*b* of the first timing indicator set TDS1. However, the remaining timing indicators TDS1*a* and TDS2*a* of the first and second timing indicator sets TDS1 and TDS2 overlap the timing indicators TDS1*b* and TDS2*b* at different positions in different shift paths at different timings, so that a user may easily determine timing indicated by the two timing indicator sets based on the positions and the shift paths of the timing indicators TDS1*a* and TDS2*a*.

FIG. 5 represents an example of the case where a shift path TDP of a timing indicator TDa of a timing indicator set is a curve. In the present invention, both the timing indicators TDa and TDb of the timing indicator set may also be shifted, and only one timing indicator (TDa in FIG. 5) may also be shifted. Further, the timing indicator may be shifted along various paths, such as a curve, as well as a straight line, along the predetermined shift path TDP.

FIGS. 6A to 9 are diagrams illustrating examples of an input indicator displayed together with a timing indicator.

FIGS. 6A to 6C represent the case where an input indicator IPD includes one timing indicator TDb between two timing indicators TDa and TDb of a timing indicator set. In FIG. 6, the timing indicator TDb has a fixed position and form, but a size of the timing indicator TDa is increased while shifting in a direction of the timing indicator TDb. In the meantime, the input indicator IPD is formed to be larger than the timing indicator TDb, so that the timing indicator TDb is disposed inside the input indicator IPD. In order to prevent a finger of a user from hiding the timing indicators TDa and TDb even when the user touches the input indicator IPD as described above, the input indicator IPD is implemented to be larger than the timing indicator TDb.

FIGS. 7A to 7C represent the case where both two timing indicators TDa and TDb of a timing indicator set are not shifted, but are included in the input indicator IPD. Although both two timing indicators TDa and TDb of a timing indicator set are not shifted, a size of the timing indicator TDa is gradually increased from a smaller form than that of the timing indicator TDb, so that a user may easily recognize that a time, at which sizes of the two timing indicators TDa and TDb are matched, is touch timing. Even in this case, the user may touch a partial region of the input indicator IPD, in which the timing indicators TDa and TDb are disposed, thereby visually confirming the timing indicators TDa and TDb at the touch timing.

FIGS. 8A to 8C represent the case where both two timing indicators TDa and TDb are shifted. As illustrated in FIG. 8, both two timing indicators TDa and TDb of the timing indicator set may be implemented to be shifted, and in this case, the input indicator IPD may also be implemented to be shifted together with one timing indicator TDb between the two shifted timing indicators TDa and TDb. Further, even when the input indicator IPD is shifted together with the timing indicator TDb, the input indicator IPD may be implemented to be larger than the timing indicator TDb so that the timing indicator TDb is included in the input indicator IPD.

Unlike FIGS. 6A to 6C, FIG. 9 illustrates the case where a size of one timing indicator TDa between two timing indicators TDa and TDb is decreased while being shifted. Further, in FIG. 6, the fixed timing indicator TDb is displayed only with a contour line so that the internal side of the timing indicator TDb is transparent, but in FIG. 9, the shifted timing indicator TDa is displayed only with a contour line so that the internal side of the timing indicator TDa is transparent. That is, the display form of the timing indicators TDa and TDb may be variously adjusted.

As illustrated in FIGS. 6A to 6C and 8A to 8C, the input indicator IPD may be set to be shifted together when one timing indicator TDb between the two timing indicators TDa and TDb of the timing indicator set is shifted.

FIG. 10 is a diagram illustrating various forms of the input indicator.

As illustrated in FIG. 10, the input indicator control unit 340 may implement the input indicators having various forms and sizes, and may also implement the input indicator so that the form of the input indicator is varied according to times T1 to T3.

FIGS. 11A to 12D are diagrams illustrating examples of a timing input by using the input indicator of the present invention.

As described above, the apparatus for providing the timing game based on the touch of the present invention displays the input indicator IPD designating a touch region which a user is to actually touch, the input indicator IPD being divided from the timing indicators TDa and TDb. The input indicator IPD is divided from the timing indicators TDa and TDb and is displayed, so that the input indicator IPD may be displayed while being disposed at a separate position which is completely separated from the timing indicators TDa and TDb, and the input indicator IPD does not need to overlap the timing indicators TDa and TDb. That is, even though the input indicator IPD at the position separated from the timing indicators TDa and TDb is touched at timing indicated by the timing indicators TDa and TDb of the timing indicator set, it may be determined that the user performs a timing input for the touch-based timing game.

However, when the touch of the input indicator IPD recognizes the timing input separately from the timing indicators TDa and TDb, it is difficult to determine the kind of timing indicator set, for which the timing input is performed, when the plurality of timing indicator sets is displayed. Further, when the input indicator IPD detects only the timing input regardless of the timing indicator set, a position of the touch is simple, so that users easily lose interests in the timing game.

Accordingly, with the change of conception, in the present invention, the input indicator IPD is utilized as an additional game element in the touch-based timing game. In order to utilize the input indicator IPD as the additional game element, in the apparatus for providing the timing game based on the touch of the present invention, when the internal side of the input indicator IPD is touched in the state where the input indicator IPD overlaps at least one timing indicator between two timing indicators TDa and TDb of the timing indicator set, the touch of the user is determined as a timing input for the timing game, and other touches are determined as touch input unrelated to the timing game. Herein, the timing input is the input used for determining a point according to accuracy of the touch in the touch-based timing game, and the touch input represents an input which is unrelated to the touch-based timing game and is not used for determination of the point.

For example, in FIG. 12A, since a user does not touch a touch region designated by the input indicator IPD, the touch is determined as a touch input, not a timing input. Further, in FIG. 12B, the user touches a touch region designated by the input indicator IPD, but the input indicator IPD does not overlap any one of the two timing indicators TDa and TDb, so that the touch is determined as a touch input, not a timing input.

In the meantime, in FIGS. 12C and 12D, the input indicator IPD overlaps one of the two timing indicators TDa and TDb, and a user touches a touch region designated by the input indicator IPD, so that the touch is determined as a timing input. Further, in FIG. 12E, the input indicator IPD overlaps both the two timing indicators TDa and TDb, but a user does not touch a touch region designated by the input indicator IPD, so that the touch is determined as a touch input, not a timing input In this case, whether the input indicator IPD overlaps the two timing indicators TDa and TDb is determined by the collision determining unit 350. That is, the touch determining unit 360 of the game control unit 300 determines the touch of the user in the state where the collision determining unit 350 determines that the input indicator IPD collides with at least one of the two timing indicators TDa and TDb, thereby determining whether the touch is the timing input or the touch input.

FIGS. 12A to 12D represent the case where a quadrangular form is vacant at a center of a quadrangular touch region designated by the input indicator IPD.

In FIGS. 12A and 12B, a center of the input indicator IPD is vacant in a quadrangular form, and one timing indicator between two timing indicators TDa and TDb is disposed in the vacant quadrangle, so that the input indicator IPD does not actually overlap any one of the two timing indicators TDa and TDb. That is, a collision does not occur between the input indicator IPD and the two timing indicators TDa and TDb.

Accordingly, the touch determining unit 360 does not determine the touches of the user in FIGS. 12A and 12B as a timing input. Particularly, the case of FIG. 12A is the case where the user does not touch the input indicator IPD, but touches the timing indicator TDb, so that the touch is not determined as a timing input.

In contrast, in the cases of FIGS. 12C and 12D, a collision occurs between the input indicator IPD and one timing indicator TDb between the two timing indicators TDa and TDb. However, in FIG. 12C, a touch position of the user is not a touch region designated by the input indicator IPD, so that the touch is not determined as a timing input, and in FIG. 12D, a touch of the user is detected in a touch region designated by the input indicator IPD, so that the touch is determined as a timing input.

FIGS. 13A to 13D are diagrams illustrating another example of a timing input by using the input indicator of the present invention.

In FIGS. 11A to 12D, a collision situation between the input indicator IPD and the timing indicators TDa and TDb is simply considered. That is, a timing input is determined in a situation where the input indicator IPD collides with the timing indicators TDa and TDb without a separate operation of the user. However, when an operation of the user is available in the touch-based timing game, it is possible to provide a touch-based timing game having a high level of difficulty which may further increase a user's interest.

In this respect, FIGS. 13A to 13D represent the case where a user drags a touch region of the input indicator IPD displayed in a user interface unit and shifts the input indicator IPD. As illustrated in FIGS. 13A to 13D, the user touches and drags the input indicator IPD to shift the input indicator IPD so as to collide with the timing indicators TDa and TDb. Further, as illustrated in FIG. 13D, the user may perform a timing input by touching the shifted input indicator IPD at touch timing represented by the two timing indicators TDa and TDb again.

FIGS. 14A to 14C are diagrams illustrating a case where a shift path of the input indicator is designated.

In FIGS. 13A to 13D, it is described that the input indicator IPD freely shifts according to the drag of the user, but the apparatus for providing the timing game based on the touch may designate a shift path IPDP, along which the input indicator IPD is shiftable, in advance, depending on a case. In this case, the shift path IPDP of the input indicator IPD may be displayed together with the input indicator IPD on the screen, and the shift path may be designated in various forms, such as a straight line, a diagonal line, and a curved line, as illustrated in FIGS. 13A to 13C.

As illustrated in FIGS. 14A to 14C, when the shift path IPDP, through which the input indicator IPD is shiftable, is designated, the input indicator IPD shifts in response to a drag position by the user, but shifts only along the designated shift path IPDP.

FIG. 15 is a diagram illustrating a case where the input indicator is formed so as to correspond to the plurality of timing indicator sets.

In FIG. 15, four timing indicator sets TDS1 to TDS4 are illustrated, but two input indicators IPD1 and IPD2 are displayed on a screen. Further, a first input indicator IPD1 between the two input indicators collides with timing indicators TDS1*b* and TDS2*b* of two timing indicator sets TDS1 and TDS2 among the four timing indicator sets TDS1 to TDS4, and a second input indicator IPD2 collides with the timing indicators TDS3*b* and TDS4*b* of the two remaining timing indicator sets TDS3 and TDS4. In this case, the first input indicator IPD1 determines a timing input for the two timing indicator sets TDS1 and TDS2, and the second input indicator IPD2 determines a timing input for the two timing indicator sets TDS3 and TDS4. Accordingly, it represents that each of the two input indicators IPD1 and IPD2 may be configured to correspond to every two timing indicator sets TDS1 and TDS2, and TDS3 and TDS4.

FIGS. 16A and 16B are diagrams illustrating another example of the input indicator.

In the above, it is described that the input indicator IPD is shiftable by the drag of the user, but a means for dividing a position of a touch for a drag and a touch for a timing input is not separately provided. Although the means for dividing a position of a touch for a drag and a touch for a timing input is not provided, it is possible to divide a touch input and a timing input according to the method described with reference to FIGS. 11A to 12D, so that the touch determining unit 360 may easily divide the drag input. Further, even though the touch input and the timing input are not divided, it is possible to easily divide the drag input according to a shift of a touch position. However, in FIGS. 16A and 16B, the input indicator IPD displays a separate drag region IPDM in addition to a touch region so as to enable the user to easily divide a drag and a touch for a timing input. As illustrated in FIGS. 16A and 16B, the input indicator control unit 340 may also variously set a form of the drag region IPDM.

FIGS. 17A to 18B are diagrams illustrating another example of the input indicator.

In the foregoing, it has been described that the input indicator IPD is shifted by the drag of the user. However, depending on a case, the input indicator control unit 340 may also set a size or a form of the input indicator IPD to be changed by a drag as illustrated in FIGS. 17A and 17B. Even in this case, the apparatus for providing the timing game based on the touch may determine the case where the input indicator IPD collides with at least one timing indicator between the two timing indicators TDa and TDb as a timing input. Further, as illustrated in FIGS. 18A and 18B, a separate drag region IPDM for changing a size or a form of the input indicator IPD may be provided. In this respect, a size of the drag region IPDM of FIGS. 18A and 18B is changed without shifting the input indicator IPD, unlike the drag region IPDM of FIGS. 16A and 16B.

FIG. 19 is a diagram illustrating another utilization example of the input indicator.

In the foregoing, the input indicator IPD is simply utilized as the means for determining the timing input, but the input indicator IPD itself may be utilized as a two-dimensional touch input determining means. For example, in FIG. 19, a touch region designated by the input indicator IPD is divided into two-dimensional coordinates of an x-axis and a y-axis, and different sound effects or image effects are generated according to a touch position, thereby further increasing an interest in the game. That is, a touch region of the input indicator IPD is divided into two-dimensional coordinates ((0, 0) to (100, 100)) of an x-axis and a y-axis, and then various sound effects may be added, such as a variation of a tone according to a coordinate value of the x-axis and a variation of a sound volume according to a coordinate value of the y-axis, by analyzing the coordinates of the touch point.

FIG. 20 is a diagram illustrating an example of touch designation timing for determining a timing input.

As described above, touch designation timing may also be determined with a specific determination time RT, but may be designated in a form of a predetermined time interval TDP. In this respect, in FIG. 20, the touch designation timing is configured so that a point may be obtained in a time interval TDP which is based on a determination time RT. The determination time RT is a touch input time TT6 and is included in the time interval TDP, and the touch-based timing game of the present invention allocates a point for a timing input in a unit of a predetermined time from a touch input time TT2 that is before the touch input time TT6 to a touch input time TT9 that is after the touch input time TT9. In this case, the touch-based timing game of the present invention allocates a higher point to a time closer to the touch input time TT6 corresponding to the predetermined determination time RT. Herein, even though the touch is input within the time interval TDP, a point is added only to a timing input, and a timing input determination is not performed on the touch input, so that a score is not assigned. That is, a point is not assigned in the state where a user touches an external side of a touch region of the input indicator IPD or the input indicator IPD does not collide with the timing indicators TDa and TDb. Further, depending on the case, a point may not be added, and a point may be set to be subtracted as a penalty.

Further, when the plurality of times of a touch is applied within the time interval TDP, only the predetermined number of times (for example, one time) of the touch is determined as a timing input, and the touches exceeding the predetermined number of times are not determined as the timing input, so that a point may not be added in case of a thoughtless repeated hit of the user.

FIGS. 21A to 21D are diagrams illustrating an example of an input continuation-type timing indicator.

In FIGS. 21A to 21D, one timing indicator TDa between two timing indicators TDa and TDb of the timing indicator set is implemented as an input continuation-type timing indicator in a form of a line. The input continuation-type timing indicator TDa in the form of the line does not temporarily overlap the other timing indicator TDb, but continuously overlaps while the line continues. Accordingly, the user needs to simultaneously maintain the touch for the input indicator IPD and a collision state of the timing indicator TDb and the input indicator IPD while the line continues. Further, a portion of the input continuation-type timing indicator TDa shifting according to a time, which overlaps the timing indicator TDb, disappears, so that when a last region of the input continuation-type timing indicator TDa disappears, the user stops the touch from the input indicator IPD.

When the user stops the touch before the input continuation-type timing indicator TDa disappears or the collision state of the timing indicator TDb and the input indicator IPD is released, a point may be set not to be added or to be subtracted.

FIGS. 22A to 23 are diagrams illustrating other examples of the input continuation-type timing indicator.

In FIGS. 22A to 22C, the input continuation-type timing indicator TDa is implemented in a curved line, not a straight line. Further, the input indicator IPD is implemented to be shiftable along a designated shift path. In this respect, when the timing indicators TDa and TDb of the timing indicator set overlaps, the user makes the input indicator IPD to collide with the timing indicators TDa and TDb by dragging the input indicator IPD along the shift path, thereby performing a timing input.

FIG. 23 represents the state where a shift path for the input indicator IPD is not designated. Accordingly, the user may make the input indicator IPD to collide with the timing indicators TDa and TDb of the timing indicator set by freely shifting the input indicator IPD.

FIG. 24 is a diagram illustrating an example of an input prohibition-type timing indicator.

The existing touch-based timing game displays only a timing indicator designating touch timing of a user. However, according to an increase in game adaptation of users, demands for a touch-based timing game having a higher level of difficulty have increased. In this case, in the present invention, the timing indicator control unit 330 may additionally provide an input prohibition-type timing indicator to a timing indicator set, as well as a timing indicator.

As illustrated in FIG. 24, two input prohibition-type timing indicators may make a pair similar to the timing indicator, and may be displayed as an input prohibition-type timing indicator set. One input prohibition-type timing indicator DTD1b, DTD2b, DTD3b, or DTD4b in the input prohibition-type timing indicator set may be displayed in the same form as that of the existing timing indicator. However, at least one input prohibition-type timing indicator DTD1a, DTD2a, DTD3a, or DTD4a needs to be essentially displayed in a form determined from the timing indicator and to be easily recognized by the user. When the user performs a timing input at timing designated by the input prohibition-type timing indicator set, a penalty point may be added.

FIGS. 25A to 25D are diagrams illustrating an example of a shift path obstacle.

Unlike the input prohibition-type timing indicator of FIG. 24, a shift path obstacle DPD of FIGS. 25A to 25D means an obstacle disposed in a shift path of the timing indicator TDa. The shift path obstacle DPD is an obstacle assigning a penalty point when the shift path obstacle DPD collides with the timing indicator according to the shift of the timing indicator along the shift path as illustrated in FIG. 25B, and the user needs to remove the shift path obstacle DPD by a predetermined method before the timing indicator TDa shifts and collides with the shift path obstacle DPD as illustrated in FIG. 25C. Herein, the method of removing the shift path obstacle DPD may be various set, for example, a removal by one time touch, a removal by the predetermined number of times of a touch, and a removal by dragging the input indicator IPD and making the input indicator IPD collide with the shift path obstacle DPD.

FIG. 26 is a diagram illustrating another example of the shift path obstacle.

A shift path obstacle DPD of FIG. 26 is implemented in a form of a line, unlike the shift path obstacle DPD of FIGS. 25A to 25D. When the shift path obstacle DPD is implemented in the form of the line, a user may erase the shift path obstacle DPD by dragging the shift path obstacle DPD along a line DPDP.

In FIGS. 25A to 26, it is described that the shift path obstacle DPD is the obstacle hindering the shift path of the timing indicator TDa. However, in the present invention, the input indicator IPD may also be shifted through the drag, so that the shift path obstacle DPD may also be utilized as the obstacle hindering the shift path of the input indicator IPD. For example, when the user drags the input indicator IPD, the input indicator IPD may be restricted to be shifted so as not to collide with the shift path obstacle DPD. However, when the shift path obstacle DPD is utilized as the obstacle for the input indicator IPD, the shift path obstacle DPD may be implemented by the input indicator control unit 340. Further, the shift path obstacle DPD may be divided into an input indication obstacle and a timing indication obstacle according to whether the shift path obstacle DPD is the obstacle for the input indicator IPD and whether the shift path obstacle DPD is the obstacle for the timing indicators TDa and TDb.

When the input indicator IPD collides with the shift path obstacle, a point may be subtracted or the input indicator may be controlled to disappear until a next timing indicator set TDS is displayed.

FIG. 27 is a diagram illustrating a method of providing a timing game based on a touch according to an exemplary embodiment of the present invention.

A method of providing a timing game based on a touch of FIG. 27 will be described with reference to FIGS. 1 to 26. The apparatus for providing the timing game based on the touch first configures a game background image and outputs the game background image through the image output unit 200 by analyzing the image configuring unit 320, game data stored in the memory unit 310 of the game control unit 300 and obtaining image data (S10). In this case, the timing indicator control unit 330 and the input indicator control unit 340 analyze game data stored in the memory unit 310 and obtain timing indicator set data and input indicator data, respectively.

Then, the input indicator control unit 340 determines whether a time is an input indicator display time from the obtained input indicator data (S20). When it is determined that the time is the input indicator display time, the input indicator control unit 340 designates a form and a size of an input indicator IPD, transmits the input indicator IPD to the image configuring unit 320, and displays the input indicator IPD to a user (S30). In this case, a position, at which the input indicator is displayed, may be fixed, and may be displayed so as to be shifted along a designated path according to time.

Depending on a case, the input indicator control unit 340 may also display an input indicator obstacle that is a shift path obstacle of the input indicator.

In the meantime, the timing indicator control unit 330 determines whether the time is a timing indicator display time from the obtained timing indicator set data (S40). The timing indicator control unit 330 determines the display time of the timing indicator separately from the input indicator IPD, and sets a form and a size, in which a timing indicator set TDS is displayed, regardless of the input indicator IPD and transmits the timing indicator set TDS to the image configuring unit 320 to display the timing indicator set TDS to the user (S50). Further, the timing indicator control unit 330 may also divide times of the display of the two timing indicators of the timing indicator set TDS to be different from each other. Further, the timing indicator control unit 330 may display one timing indicator between the two timing indicators of the timing indicator set as an input continuation-type timing indicator, and may also display one timing indicator between the two timing indicators of the timing indicator set as an input prohibition-type timing indicator, depending on a case. In addition, the timing indicator control unit 330 may also display a timing indicator obstacle that is a shift path obstacle in a shift path of the timing indicator.

In the meantime, the touch determining unit 360 analyzes a detection signal, which is obtained by detecting a touch of the user and is transmitted by the touch detecting unit 100, and determines whether a drag signal for the input indicator IPD is input (S60). When it is determined that the drag signal is input, the input indicator control unit 340 shifts the input indicator IPD according to the drag signal (S70). In this case, when a shift available path of the input indicator IPD is designated, the input indicator control unit 340 may control the input indicator IPD to be shifted only in the shift available path. Further, when the position of the input indicator IPD is fixed or the input indicator IPD is set to be shifted along the shift path according to time, the input indicator control unit 340 controls the input indicator IPD to maintain the fixed position or to be shifted regardless of the drag of the user. In addition, when the drag signal for the input indicator IPD is input, the input indicator control unit 340 varies a size of the input indicator IPD according to the drag when the input indicator IPD is set to have a changed size without shifting.

Then, the touch determining unit 360 determines whether a touch for the input indicator IPD is detected (S80). When it is determined that the touch for the input indicator IPD is detected, the collision determining unit 350 determines whether the input indicator IPD is in a collision state with at least one timing indicator TDa and TDb of the timing indicator set (S90). When it is determined that the input indicator IPD is in the collision state with at least one timing indicator TDa and TDb of the timing indicator set, it is determined that the touch of the user is a timing input (S100). Further, the touch determining unit 360 assigns a point according to whether a time point, at which the timing input is generated, is included in a time interval designated by the timing indicator set (S110). Herein, the touch determining unit 360 may divide the designated time interval into a plurality of time intervals again and assign different points according to a timing input time point. Further, when it is determined that the timing input for the input prohibition-type timing indicator is generated, the touch determining unit 360 may add a penalty point.

Although not illustrated, the touch determining unit 360 may determine whether a touch input is a touch for the timing indicator obstacle when the touch input, not the timing input, is generated, and remove the timing indicator obstacle.

As described above, the apparatus and the method of providing the timing game based on the touch of the present invention provide a user with the input indicator guiding a region, which a user is to touch, separately from the timing indicator set formed of the plurality of timing indicators guiding touch timing, thereby enabling the user to visually confirm accurate touch timing indicated by the timing indicator set. Further, the apparatus and the method of providing the timing game based on the touch of the present invention may provide a new game progress method, which has not been provided in the existing touch-based timing game, by providing a fluid input indicator, as well as a timing indicator, thereby enabling a user to experience a more various and intensified game. Further, the apparatus and the method of providing the timing game based on the touch of the present invention may additionally provide the input prohibition-type timing indicator and the shift path obstacle for the timing indicator and the input indicator, thereby providing a more interesting game.

The method according to the present invention may be implemented as a computer-readable code in a computer-readable recording medium. The computer-readable recording medium includes every type of recording device in which data readable by a computer system is stored. Examples of the recording medium are a ROM, a RAM, a CD-ROM, a magnetic tape, a floppy disk, an optical data storing device, and include a device implemented in a form of a carrier wave (for example, transmission through the Internet). Further, in the computer-readable recording medium, a code, which is distributed to computer systems connected through a network and is readable by a computer by a distribution method, may be stored and executed.

The present invention has been described with reference to the exemplary embodiments illustrated in the drawings, but the exemplary embodiments are only illustrative, and it would be appreciated by those skilled in the art that various modifications and equivalent exemplary embodiments may be made.

Accordingly, the true scope of the present invention shall be determined by the technical spirit of the appended claims.

What is claimed is:

1. An apparatus for providing a timing game based on a touch, the apparatus comprising:

a user interface unit which includes one or more contact sensors, detects whether a user inputs a touch and a touch position and generates a detection signal, and outputs a game image; and a game control unit which controls (i) one or more timing indicator sets with a plurality of timing indicators indicating touch timing of the user and (ii) one or more input indicators indicating a touch region to be touched by the user in the user interface unit to be included in the game image by analyzing pre-stored game data, wherein the game control unit determines whether the detection signal is a timing input or a touch input according to whether there is a collision of an overlapping region between (i) at least one region of overlapping timing indicators among the plurality of timing indicators included in the one or more timing indicator sets and (ii) a region of the input indicator shifted in response to the user's operation that occurs when the detection signal is applied from the user interface unit, and wherein the game control unit configures an image according to a time point of the generation of the timing input, outputs the configured image through the user interface unit, and assigns a point when the detection signal is determined as the timing input.

2. The apparatus of claim 1, wherein the game control unit includes:

a memory unit in which the game data is stored;

a timing indicator control unit which analyzes the game data and obtains timing indicator set data, sets a time, a position, and a form, in which the one or more timing indicator sets are to be displayed on the game image, according to the obtained timing indicator set data, and generates timing indicator information;

an input indicator control unit which analyzes the game data and obtains input indicator data, sets a time, a position, and a form, in which the one or more input indicators are to be displayed on the game image according to the obtained input indicator data, and generates input indicator information;

a collision determining unit which receives and analyzes the timing indicator information and the input indicator information, determines whether the input indicator collides with the one or more timing indicators of the corresponding timing indicator set, and generates a collision signal;

a touch determining unit which receives the timing indicator information and the input indicator information and analyzes touch designation timing and a touch designation region, and receives the detection signal and determines whether the touch of the user is matched with the touch designation timing and the touch designation region; and an image configuring unit which obtains a game background image included in the game data, configures the game image by inserting the one or more timing indicator sets and the one or more input indicators to the game background image according to the timing indicator information and the input indicator information, and transmits the configured game image to the user interface unit.

3. The apparatus of claim 2, wherein when the detection signal is matched with the touch designation region and the collision signal is applied from the collision determining unit, the touch determining unit determines that the touch is the timing input, and when the detection signal is not matched with the touch designation region or the collision signal is not applied, the touch determining unit determines that the touch is the touch input.

4. The apparatus of claim 3, wherein when the internal side of the input indicator is touched in the state where the input indicator overlaps at least one timing indicator between two timing indicators of the timing indicator set, the touch determining unit determines whether the touch of the user is as a timing input for the timing game.

5. The apparatus of claim 4, wherein when it is determined that the detection signal is matched with the touch designation region and is dragged, the input indicator control unit shifts the input indicator so as to collide with the timing indicators along a path of the drag and the input indicator control unit performs a timing input by the user's touching the shifted input indicator again.

6. The apparatus of claim 5, wherein the input indicator control unit sets the input indicator that has a separate drag region in addition to a touch region so as to enable the user to easily divide a drag and a touch for a timing input.

7. The apparatus of claim 6, wherein the input indicator control unit sets a size or a form of the input indicator to be changed by a drag and provides a separate drag region for changing the size or the form of the input indicator.

8. A method of providing a timing game based on touch, the apparatus including a user interface unit and a game control unit, the method comprising:
   analyzing, by the game control unit, pre-stored game data, displaying a game image through the user interface unit, and obtaining timing indicator set data and input indicator data;
   setting, by the game control unit, one or more timing indicator sets with a plurality of timing indicators which indicate touch timing of a user, and time, positions, and forms in which one or more input indicators indicating a touch region to be touched by the user on the user interface unit are to be displayed on the game image based on the timing indicator set data and the input indicator data, thereby generating timing indicator information and input indicator information;
   displaying, by the game control unit, the one or more timing indicator sets including two timing indicators in the game image according to the timing indicator information;
   displaying, by the game control unit, the one or more input indicators in the game image according to the input indicator information;
   determining whether the detection signal is a timing input or a touch input according to whether there is collision of an overlapping region between (i) at least one region of timing indicators among the plurality of timing indicators included in the one or more timing indicator sets and (ii) a region of the input indicator shifted in response to the user's drag operation that occurs when the detection signal is applied from the user interface unit and
   when the detection signal is determined as the timing input, assigning a point according to a time point of a generation of the timing input.

9. The method of claim 8, wherein the determining of whether the detection signal is the touch input includes:
   receiving and analyzing the timing indicator information and the input indicator information, determining whether the input indicator collides with the one or more timing indicators of the corresponding timing indicator set, and generating a collision signal;
   receiving the detection signal, and determining whether the touch of the user is matched with touch designation timing set by the timing indicator information and a touch designation region set by the input indicator information;
   when the detection signal is matched with the touch designation region and the collision signal is generated, determining the detection signal as the timing input; and
   when the detection signal is not matched with the touch designation region or the collision signal is not generated, determining the detection signal as the touch input.

10. The method of claim 9, wherein the assigning of the point includes, when the detection signal is determined as the timing input, determining whether a time point of the generation of the timing input is matched with a time interval designated by the touch designation timing, and assigning a predetermined point.

11. The method of claim 9, wherein the inserting of the one or more timing indicator sets includes:
   inserting the two timing indicators of the one or more timing indicator sets at different times, at different positions, and in different forms on the game image according to the timing indicator set information; and
   shifting the two timing indicators of the one or more timing indicator sets so as to overlap each other at the touch designation timing.

12. The method of claim 11, wherein the inserting of the two timing indicators of the one or more timing indicator sets at the different times, at the different positions, and in the different forms includes displaying one timing indicator among the two timing indicators as an input continuation-type timing indicator in a form of a line so that the one or more timing indicator sets indicate continuation-type touch timing.

13. The method of claim 11, wherein the inserting of the one or more input indicators includes:
   inserting the one or more input indicators to the game image according to the input indicator data;
   determining whether the detection signal is matched with the touch designation region and is dragged; and
   when the detection signal is matched with the touch designation region and is dragged, shifting the input indicator along a path of the drag.

14. The method of claim 13, wherein the inserting of the one or more input indicators includes setting a predetermined partial region in the touch designation region of the input indicator as a drag region for the drag.

15. A non-transitory computer-readable recording medium, in which a program command for implementing the method of providing the timing game based on the touch of claim 8 is recorded.

* * * * *